United States Patent
Huo et al.

(10) Patent No.: US 12,082,186 B2
(45) Date of Patent: Sep. 3, 2024

(54) SCHEDULING METHOD AND APPARATUS

(71) Applicant: HUAWEI TECHNOLOGIES CO., LTD., Guangdong (CN)

(72) Inventors: Qiang Huo, Shanghai (CN); Zhiqiang Zou, Shanghai (CN); Huajia Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 469 days.

(21) Appl. No.: 17/383,292

(22) Filed: Jul. 22, 2021

(65) Prior Publication Data

US 2021/0352693 A1 Nov. 11, 2021

Related U.S. Application Data

(63) Continuation of application No. PCT/CN2019/127076, filed on Dec. 20, 2019.

(30) Foreign Application Priority Data

Jan. 22, 2019 (CN) .......................... 201910059124.X

(51) Int. Cl.
*H04W 72/1268* (2023.01)
*H04W 72/044* (2023.01)
(Continued)

(52) U.S. Cl.
CPC ... *H04W 72/1268* (2013.01); *H04W 72/0453* (2013.01); *H04W 72/046* (2013.01); *H04W 72/1273* (2013.01); *H04W 72/54* (2023.01)

(58) Field of Classification Search
CPC ......... H04W 72/1268; H04W 72/0453; H04W 72/046; H04W 72/1273; H04W 72/54;
(Continued)

(56) References Cited

U.S. PATENT DOCUMENTS

2009/0154419 A1 6/2009 Yoshida et al.
2015/0326381 A1* 11/2015 Sakhnini ............... H04L 5/16
370/281
(Continued)

FOREIGN PATENT DOCUMENTS

CN 103986482 A 8/2014
CN 105898872 A 8/2016
(Continued)

OTHER PUBLICATIONS

ZTE, Discussion on harmonics and intermodulation distortion caused by the initial scenario band 8+band 20 for MB-MSR. 3GPP TSG-RAN WG4 (Radio) Meeting #62bis, Jeju, Korea, Mar. 26-30, 2012, R4-121333, 4 pages.

*Primary Examiner* — Nizam U Ahmed
(74) *Attorney, Agent, or Firm* — Gregg Jansen

(57) ABSTRACT

Embodiments of this application provide a scheduling method and apparatus, and relate to the communications field. The method includes: A base station obtains information about predicted interference of N downlink signals of the base station to an uplink signal, where N is an integer greater than 1, and the information about predicted interference is used to indicate predicted interference impact, on the uplink signal, of passive intermodulation signals generated by interaction between the N downlink signals. Then, the base station may perform resource scheduling on the N downlink signals and/or the uplink signal based on the obtained information about predicted interference, where the resource scheduling includes frequency domain resource scheduling and space domain resource scheduling. In this application, the interference impact of the passive intermodulation signals can be effectively reduced, thereby improving system performance and radio resource utilization.

17 Claims, 9 Drawing Sheets

(51) Int. Cl.
*H04W 72/0453* (2023.01)
*H04W 72/1273* (2023.01)
*H04W 72/54* (2023.01)

(58) Field of Classification Search
CPC .... H04W 72/542; H04W 24/04; H04B 1/525;
H04B 15/04; H04B 7/0617
USPC .......................................................... 370/329
See application file for complete search history.

(56) References Cited

U.S. PATENT DOCUMENTS

| | | | |
|---|---|---|---|
| 2017/0019279 A1 | 1/2017 | Tobisu et al. | |
| 2018/0295617 A1* | 10/2018 | Abdelmonem | ..... H04W 72/541 |
| 2020/0163108 A1* | 5/2020 | Lin | ....................... H04L 5/0053 |
| 2021/0136753 A1* | 5/2021 | Liu | ................... H04W 72/0446 |
| 2021/0185692 A1* | 6/2021 | Stephenne | ........ H04W 72/1263 |

FOREIGN PATENT DOCUMENTS

| | | | |
|---|---|---|---|
| CN | 105991157 A | 10/2016 | |
| CN | 107040347 A | 8/2017 | |
| CN | 107113012 A | 8/2017 | |
| EP | 3331169 A1 | 6/2018 | |
| WO | 2010121657 A1 | 10/2010 | |
| WO | 2014098915 A1 | 6/2014 | |
| WO | 2015027481 A1 | 3/2015 | |
| WO | 2019220179 A1 | 11/2019 | |

* cited by examiner

SCHEDULING METHOD AND APPARATUS

CROSS-REFERENCE TO RELATED APPLICATIONS

This application is a continuation of International Application No. PCT/CN2019/127076, filed on Dec. 20, 2019, which claims priority to Chinese Patent Application No. 201910059124.X, filed on Jan. 22, 2019. The disclosures of the aforementioned applications are herein incorporated by reference in their entireties.

TECHNICAL FIELD

Embodiments of this application relate to the communications field, and in particular, to a scheduling method and apparatus.

BACKGROUND

Currently, in a communications system, due to factors such as an analog component (such as a cable, a duplexer, or an antenna feeder) of the communications system or an external transmission environment (such as a metal component of an antenna tower or a metal component near an antenna), passive intermodulation signals generated by interaction between downlink transmit signals of a base station cause interference to an uplink receive signal.

Systems and methods that can suppress interference from the passive intermodulation signals are needed.

SUMMARY

This application provides a scheduling method and apparatus, to effectively improve an effect of suppressing interference from passive intermodulation signals.

To achieve the foregoing objective, the following technical solutions are used in this application.

According to a first aspect, an embodiment of this application provides a scheduling method, applied to a base station. The method includes: A base station obtains information about predicted interference of N downlink signals of the base station to an uplink signal, where N is an integer greater than 1, and the information about predicted interference is used to indicate predicted interference impact, on the uplink signal, of passive intermodulation signals generated by interaction between the N downlink signals. Then, the base station may perform resource scheduling on the N downlink signals and/or the uplink signal based on the obtained information about predicted interference, where the resource scheduling includes frequency domain resource scheduling and space domain resource scheduling.

According to the foregoing manner, interference from the passive intermodulation signals is suppressed in a plurality of dimensions: a dimension of a frequency domain resource and a dimension of a space domain resource, so that the interference impact of the passive intermodulation signals can be effectively reduced, thereby improving system performance and radio resource utilization.

Optionally, in a possible manner, the information about predicted interference is predicted interference impact of $n_1$ downlink scheduling units on the uplink signal, where the $n_1$ downlink scheduling units are located on carriers corresponding to the N downlink signals, and $n_1$ is an integer greater than 1.

According to the foregoing manner, the base station can predict the interference impact of the $n_1$ specified downlink scheduling units on the uplink signal.

Optionally, in a possible manner, the performing resource scheduling on the N downlink signals and/or the uplink signal based on the information about predicted interference specifically includes: The base station determines, based on the information about predicted interference, $m_1$ uplink scheduling units on a carrier corresponding to the uplink signal, where the $m_1$ uplink scheduling units are first $m_1$ scheduling units, on the carrier corresponding to the uplink signal, arranged in ascending order of interference impact of passive intermodulation signals generated by the $n_1$ downlink scheduling units, and $m_1$ is an integer greater than or equal to 1. Then, the base station schedules the $m_1$ uplink scheduling units.

According to the foregoing manner, the base station can determine, based on the interference impact on the uplink signal, the $m_1$ uplink scheduling units that are least affected by the interference, and schedule the $m_1$ uplink scheduling units, thereby effectively improving an effect of suppressing the interference from the passive intermodulation signals.

Optionally, in a possible manner, the information about predicted interference is predicted interference impact, on $m_2$ uplink scheduling units, of the passive intermodulation signals generated by interaction between the N downlink signals, where the $m_2$ uplink scheduling units are located on the carrier corresponding to the uplink signal, and $m_2$ is an integer greater than or equal to 1.

According to the foregoing manner, the base station can predict the interference impact of the N downlink signals on the $m_2$ specified downlink scheduling units.

Optionally, in a possible manner, the performing resource scheduling on the N downlink signals and/or the uplink signal based on the information about predicted interference specifically includes: The base station determines, based on the information about predicted interference, $n_2$ downlink scheduling units on the carriers corresponding to the N downlink signals, where the $n_2$ downlink scheduling units are first $n_2$ downlink scheduling units, on the carriers corresponding to the N downlink signals, arranged in ascending order of interference impact on the $m_2$ uplink scheduling units, and $n_2$ is an integer greater than 1. The base station schedules the $n_2$ downlink scheduling units.

According to the foregoing manner, the base station can determine, based on the interference impact on the $m_2$ uplink scheduling units, the $n_2$ downlink scheduling units that have smallest interference impact on the $m_2$ uplink scheduling units, and schedule the $n_2$ downlink scheduling units, thereby effectively improving an effect of suppressing the interference from the passive intermodulation signals.

Optionally, in a possible manner, the method may further include: The base station obtains an interference relationship between one or more downlink scheduling unit combinations on the carriers corresponding to the N downlink signals and each uplink scheduling unit on the carrier corresponding to the uplink signal, where each downlink scheduling unit combination includes two or more downlink scheduling units on carriers corresponding to two or more downlink signals in the N downlink signals. The obtaining the information about predicted interference of the N downlink signals of the base station to the uplink signal specifically includes: The base station obtains the information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

According to the foregoing manner, the base station can further obtain, based on the pre-established interference relationship, the information about predicted interference of the downlink signals to the uplink signal, thereby improving reliability and accuracy of the scheduling method.

Optionally, in a possible manner, the obtaining the interference relationship between the one or more downlink scheduling unit combinations on the carriers corresponding to the N downlink signals and each uplink scheduling unit on the carrier corresponding to the uplink signal specifically includes: The base station may obtain a first passive intermodulation signal based on each downlink scheduling unit combination. The base station determines information about interference to each uplink scheduling unit based on the first passive intermodulation signal, where the information about interference is used to indicate interference impact of the first passive intermodulation signal on each uplink scheduling unit.

According to the foregoing manner, the base station can obtain a result of interference impact of each downlink scheduling unit combination on each uplink scheduling unit, so that the base station can establish an interference relationship between a downlink scheduling unit combination and an uplink scheduling unit based on an interference result.

Optionally, in a possible manner, the method may further include: The base station receives a target uplink signal, where the target uplink signal includes a desired signal sent by a terminal and an interference signal generated due to the interference impact of the passive intermodulation signals; and performs spatial filtering on the target uplink signal.

According to the foregoing manner, the effect of suppressing the interference from the passive intermodulation signals can be further improved.

Optionally, in a possible manner, the performing spatial filtering on the target uplink signal specifically includes: The base station generates a spatial filtering matrix based on the information about predicted interference, and performs spatial filtering on a signal at a frequency domain resource position of the target uplink signal based on the spatial filtering matrix.

According to the foregoing manner, the base station can generate the spatial filtering matrix based on the pre-obtained information about predicted interference, thereby improving filtering quality, and further improving the effect of suppressing the interference from the passive intermodulation signals.

Optionally, in a possible manner, the generating the spatial filtering matrix based on the information about predicted interference specifically includes: The base station obtains information about actual interference to the target uplink signal based on a relationship between the frequency domain resource position and the information about predicted interference, where the information about actual interference is used to indicate actual interference impact, on the target uplink signal, of the passive intermodulation signals generated by interaction between the N downlink signals; obtains weight information of an uplink scheduling unit corresponding to the frequency domain resource position; generates a spatial interference matrix U based on the information about actual interference and the weight information, where U includes a first matrix $U_1$ and a second matrix $U_2$, $U_1$ is used to indicate an interference space that is most affected by interference from the passive intermodulation signals generated by interaction between the N downlink signals, and $U_2$ is used to indicate an interference space that is least affected by the interference from the passive intermodulation signals generated by interaction between the N downlink signals; and generates the spatial filtering matrix based on $U_1$ or $U_2$.

According to the foregoing manner, the base station can generate the spatial filtering matrix based on the pre-obtained information about actual interference, thereby improving filtering quality, and further improving the effect of suppressing the interference from the passive intermodulation signals.

According to a second aspect, an embodiment of this application provides a scheduling apparatus, used in a base station. The apparatus may include a first obtaining module and a scheduling module. The first obtaining module may be configured to obtain information about predicted interference of N downlink signals of the base station to an uplink signal, where N is an integer greater than 1, and the information about predicted interference is used to indicate predicted interference impact, on the uplink signal, of passive intermodulation signals generated by interaction between the N downlink signals. The scheduling module may be configured to perform resource scheduling on the N downlink signals and/or the uplink signal based on the information about predicted interference, where the resource scheduling includes frequency domain resource scheduling and space domain resource scheduling.

Optionally, in a possible manner, the information about predicted interference is predicted interference impact of $n_1$ downlink scheduling units on the uplink signal, where the $n_1$ downlink scheduling units are located on carriers corresponding to the N downlink signals, and $n_1$ is an integer greater than 1.

Optionally, in a possible manner, the scheduling module may be further configured to: determine, based on the information about predicted interference, $m_1$ uplink scheduling units on a carrier corresponding to the uplink signal, where the $m_1$ uplink scheduling units are first $m_1$ scheduling units, on the carrier corresponding to the uplink signal, arranged in ascending order of interference impact of passive intermodulation signals generated by the $n_1$ downlink scheduling units, and $m_1$ is an integer greater than or equal to 1; and schedule the $m_1$ uplink scheduling units.

Optionally, in a possible manner, the information about predicted interference is predicted interference impact, on $m_2$ uplink scheduling units, of the passive intermodulation signals generated by interaction between the N downlink signals, where the $m_2$ uplink scheduling units are located on the carrier corresponding to the uplink signal, and $m_2$ is an integer greater than or equal to 1.

Optionally, in a possible manner, the scheduling module may be further configured to: determine, based on the information about predicted interference, $n_2$ downlink scheduling units on the carriers corresponding to the N downlink signals, where the $n_2$ downlink scheduling units are first $n_2$ downlink scheduling units, on the carriers corresponding to the N downlink signals, arranged in ascending order of interference impact on the $m_2$ uplink scheduling units, and $n_2$ is an integer greater than 1; and schedule the $n_2$ downlink scheduling units.

Optionally, in a possible manner, the apparatus may further include a second obtaining module. The module is configured to obtain an interference relationship between one or more downlink scheduling unit combinations on the carriers corresponding to the N downlink signals and each uplink scheduling unit on the carrier corresponding to the uplink signal, where each downlink scheduling unit combination includes two or more downlink scheduling units on carriers corresponding to two or more downlink signals in the N downlink signals. Correspondingly, the first obtaining module may be further configured to obtain the information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

Optionally, in a possible manner, the second obtaining module may be further configured to: obtain a first passive intermodulation signal based on each downlink scheduling unit combination; and determine information about interference to each uplink scheduling unit based on the first passive intermodulation signal, where the information about interference is used to indicate interference impact of the first passive intermodulation signal on each uplink scheduling unit.

Optionally, in a possible manner, the apparatus may further include: a receiving module, configured to receive a target uplink signal, where the target uplink signal includes a desired signal sent by a terminal and an interference signal generated due to the interference impact of the passive intermodulation signals; and a spatial filtering module, configured to perform spatial filtering on the target uplink signal.

Optionally, in a possible manner, the spatial filtering module is further configured to: generate a spatial filtering matrix based on the information about predicted interference, and perform spatial filtering on a signal at a frequency domain resource position of the target uplink signal based on the spatial filtering matrix.

Optionally, in a possible manner, the spatial filtering module is further configured to: obtain information about actual interference to the target uplink signal based on a relationship between the frequency domain resource position and the information about predicted interference, where the information about actual interference is used to indicate actual interference impact, on the target uplink signal, of the passive intermodulation signals generated by interaction between the N downlink signals; obtain weight information of an uplink scheduling unit corresponding to the frequency domain resource position; generate a spatial interference matrix U based on the information about actual interference and the weight information, where U includes a first matrix $U_1$ and a second matrix $U_2$, $U_1$ is used to indicate an interference space that is most affected by interference from the passive intermodulation signals generated by interaction between the N downlink signals, and $U_2$ is used to indicate an interference space that is least affected by the interference from the passive intermodulation signals generated by interaction between the N downlink signals; and generate the spatial filtering matrix based on $U_1$ or $U_2$.

According to a third aspect, an embodiment of this application provides an apparatus. The apparatus may be a wireless communications apparatus. The apparatus may be a base station, or may be a chip in the base station. The apparatus has a function of implementing the method according to the first aspect. The function may be implemented by hardware, or may be implemented by hardware executing corresponding software. The hardware or the software includes one or more modules corresponding to the function. The apparatus includes a processing unit and a communications unit. Optionally, the apparatus may further include a storage unit. The processing unit may receive or send information by using the communications unit, and the processing unit may process the information, to enable the apparatus to implement the method according to the first aspect.

In an optional design, when the apparatus is the base station, the base station includes a processing unit and a communications unit. The processing unit may be, for example, a processor, and the communications unit may be, for example, a transceiver. The transceiver includes a radio frequency circuit. Optionally, the base station further includes a storage unit. The storage unit may be, for example, a memory. When the base station includes the storage unit, the storage unit is configured to store computer-executable instructions. The processing unit is connected to the storage unit. The processing unit executes the computer-executable instructions stored in the storage unit, to enable the base station to perform the method according to the first aspect.

In another possible design, when the apparatus is the chip in the base station, the chip includes a processing unit and a communications unit. The processing unit may be, for example, a processor, and the communications unit may be, for example, an input/output interface, a pin, or a circuit. The processing unit may execute computer-executable instructions stored in a storage unit, to enable the chip in the base station to perform the wireless communication method according to any one of the first aspect or the possible manners of the first aspect. Optionally, the storage unit is a storage unit in the chip, for example, a register or a buffer, or may be a storage unit in the base station but outside the chip, for example, a read-only memory (read-only memory, ROM) or another type of static storage device capable of storing static information and instructions, or a random access memory (random access memory, RAM).

According to a fourth aspect, an embodiment of this application provides a computer readable medium, configured to store a computer program. The computer program includes instructions used to perform the method according to any one of the first aspect or the possible implementations of the first aspect.

According to a fifth aspect, an embodiment of this application provides a computer program. The computer program includes instructions used to perform the method according to any one of the first aspect or the possible implementations of the first aspect.

According to a sixth aspect, an embodiment of this application provides a chip. The chip includes a processing circuit and a transceiver pin. The transceiver pin and the processor communicate with each other through an internal connection path. The processor performs the method according to any one of the first aspect or the possible implementations of the first aspect, to control a receive pin to receive a signal, and to control a transmit pin to send a signal.

BRIEF DESCRIPTION OF DRAWINGS

To describe technical solutions in embodiments of this application more clearly, the following briefly describes the accompanying drawings used in describing the embodiments of this application. Clearly, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly describes technical solutions in embodiments of this application with reference to the accompanying drawings in the embodiments of this application. It is clearly that the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: only A exists, both A and B exist, and only B exists.

In the specification and claims in the embodiments of this application, the terms "first", "second", and the like are intended to distinguish between different objects but do not describe a particular order of the objects. For example, a first target object, a second target object, and the like are used to distinguish between different target objects, but are not used to describe a specific order of the target objects.

In the embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a specific manner.

In descriptions of the embodiments of this application, unless otherwise stated, "a plurality of" means two or more. For example, a plurality of processing units are two or more processing units. A plurality of systems are two or more systems.

Figure 1:
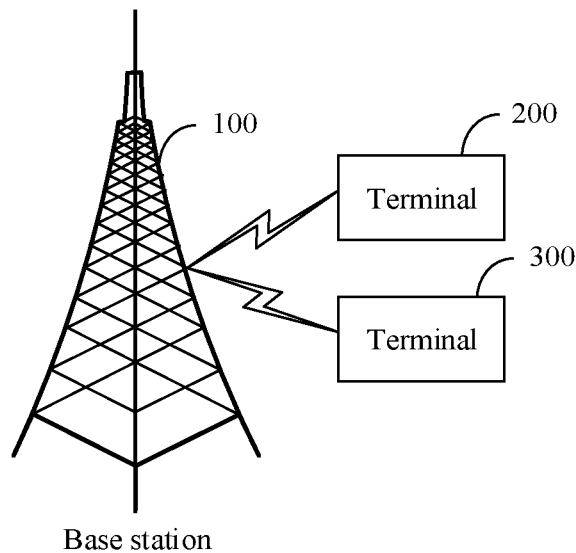
FIG. 1 is a schematic diagram of a communications system according to an embodiment of this application.

Before the technical solutions in the embodiments of this application are described, a communications system of the embodiments of this application is first described with reference to the accompanying drawings. FIG. 1 is a schematic diagram of a communications system according to an embodiment of this application. The communications system includes a base station 100, a terminal 200, and a terminal 300. During specific implementation of the embodiments of this application, the terminal may be a device such as a computer, a smartphone, a telephone set, a cable television set-top box, or a digital subscriber line router. It should be noted that, during actual application, there may be one or more base stations and one or more terminals. A quantity of base stations and a quantity of terminals in the communications system shown in FIG. 1 are merely examples. This is not limited in this application.

The communications system may be configured to support a fourth generation (fourth generation, 4G) access technology, for example, a long term evolution (long term evolution, LTE) access technology; a fifth generation (fifth generation, 5G) access technology, for example, a new radio (new radio, NR) access technology; a third generation (third generation, 3G) access technology, for example, a universal mobile telecommunications system (universal mobile telecommunications system, UMTS) access technology; a second generation (second generation, 2G) access technology, for example, a global system for mobile communications (global system for mobile communications, GSM) access technology; or a plurality of wireless technologies, for example, an LTE technology and an NR technology. In addition, the communications system is further applicable to a future-oriented communications technology.

In addition, the base station in FIG. 1 may be configured to support access of the terminal. For example, the base station may be a base transceiver station (base transceiver station, BTS) and a base station controller (base station controller, BSC) in a communications system that supports the 2G access technology, a NodeB (NodeB) and a radio network controller (radio network controller, RNC) in a communications system that supports the 3G access technology, an evolved NodeB (evolved nodeB, eNB) in a communications system that supports the 4G access technology, a next generation NodeB (next generation nodeB, gNB) in a communications system that supports the 5G access technology, a transmission reception point (transmission reception point, TRP), a relay node (relay node), or an access point (access point, AP).

Figure 2:
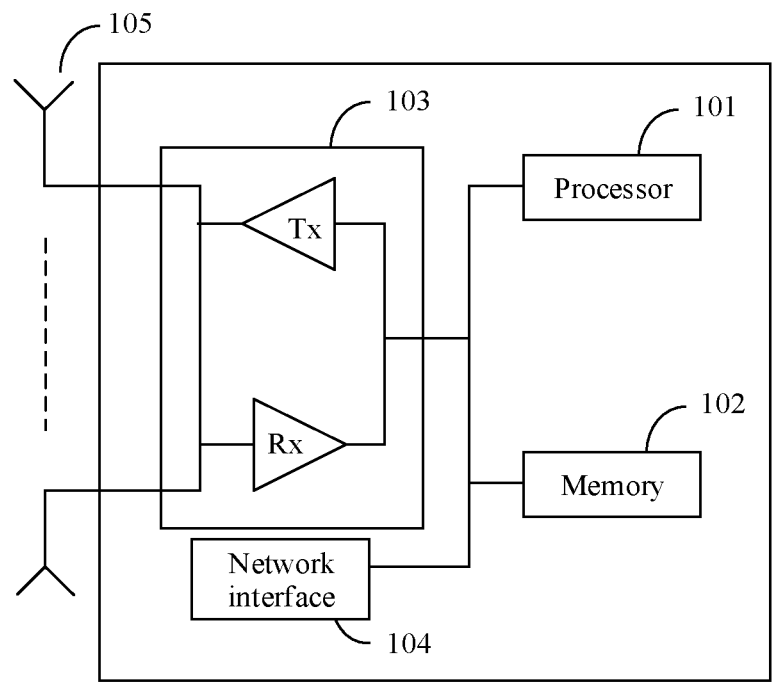
FIG. 2 is a schematic structural diagram of a base station according to an embodiment of this application.

FIG. 2 is a schematic structural diagram of a base station. In FIG. 2, the base station includes at least one processor 101, at least one memory 102, at least one transceiver 103, at least one network interface 104, and one or more antennas 105. The processor 101, the memory 102, the transceiver 103, and the network interface 104 are connected by using, for example, a bus. The antenna 105 is connected to the transceiver 103. The network interface 104 is configured to enable the base station to connect to another communications device by using a communications link. In this embodiment of this application, the connection may include various types of interfaces, transmission lines, buses, or the like. This is not limited in this embodiment.

In this embodiment of this application, the processor such as the processor 101 may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 101 may be a single-core processor (single-CPU) or a multi-core processor (multi-CPU). The at least one processor 101 may be integrated into one chip or located on a plurality of different chips.

In this embodiment of this application, the memory such as the memory 102 may include at least one of the following types: a read-only memory (read-only memory, ROM) or another type of static storage device capable of storing static information and instructions, a random access memory (random access memory, RAM) or another type of dynamic storage device capable of storing information and instructions, or an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 102 may exist independently, and is connected to the processor 101. Optionally, the memory 102 and the processor 101 may alternatively be integrated, for example, integrated into a chip. The memory 102 can store program code for executing the technical solutions in the embodiments of this application, and the processor 101 controls execution of the program code. Various types of executed computer program code may also be considered as drivers of the processor 101. For example, the processor 101 is configured to execute the computer program code stored in the memory 102, to implement the technical solutions in the embodiments of this application.

The transceiver 103 may be configured to support receiving or sending of a radio frequency signal between an access network device and a terminal, and the transceiver 103 may be connected to the antenna 105. The transceiver 103 includes a transmitter Tx and a receiver Rx. Specifically, the one or more antennas 105 may receive a radio frequency signal. The receiver Rx of the transceiver 103 is configured to: receive the radio frequency signal from the antenna, convert the radio frequency signal into a digital baseband signal or a digital intermediate frequency signal, and provide the digital baseband signal or the digital intermediate frequency signal for the processor 101, so that the processor 101 further processes the digital baseband signal or the digital intermediate frequency signal, for example, performs demodulation processing and decoding processing. In addition, the transmitter Tx of the transceiver 103 is further configured to: receive a modulated digital baseband signal or digital intermediate frequency signal from the processor 101, convert the modulated digital baseband signal or digital intermediate frequency signal into a radio frequency signal, and send the radio frequency signal through the one or more antennas 105. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

To make a person skilled in the art better understand this application, the following describes, with reference to the communications system shown in FIG. 1, a part in which a passive intermodulation signal causes interference to an uplink signal.

Specifically, passive intermodulation means that in a communications system, due to a non-ideal factor such as an analog component (such as a cable, a duplexer, or an antenna feeder) of the communications system or an external transmission environment (such as a metal component of an antenna tower or a metal component near an antenna), passive intermodulation signals are generated by interaction between the N downlink signals (where in this embodiment of this application, the downlink signal is a signal sent by the base station to the terminal, and the uplink signal is a signal sent by the terminal to the base station) of the base station. The non-ideal factor that causes the passive intermodulation signal is defined as a nonlinear source. In some frequency configurations, lower-order intermodulation of the downlink signals entirely or partially overlaps an uplink receive frequency band, resulting in interference to the overlapped frequency bands.

Figure 3:
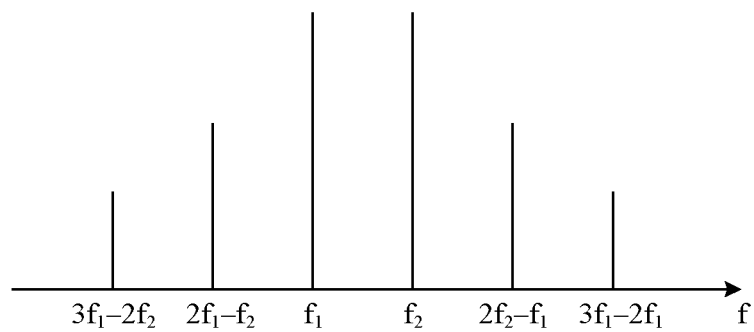
FIG. 3 is a schematic spectrum diagram of a passive intermodulation signal according to an embodiment of this application.

FIG. 3 is a schematic spectrum diagram of a passive intermodulation signal.

Specifically, refer to FIG. 3. When single-frequency signals whose frequencies are respectively $f_1$ and $f_2$ are interacted, passive intermodulation signals are generated at frequencies $\pm m^*f_1 \pm n^*f_2$ (namely, frequencies $m^*f_1+n^*f_2$, $-m^*f_1+n^*f_2$, $m^*f_1-n^*f_2$, and/or $-m^*f_1-n^*f_2$, for example, frequencies $2f_1-f_2$, $3f_1-2f_2$, $2f_2-f_1$, and $3f_2-2f_1$ shown in FIG. 3), where m and n are integers, and $|m|+|n|$ is a passive intermodulation order. For example, a passive intermodulation order of $2f_1-f_2$ is 3.

Figure 4:
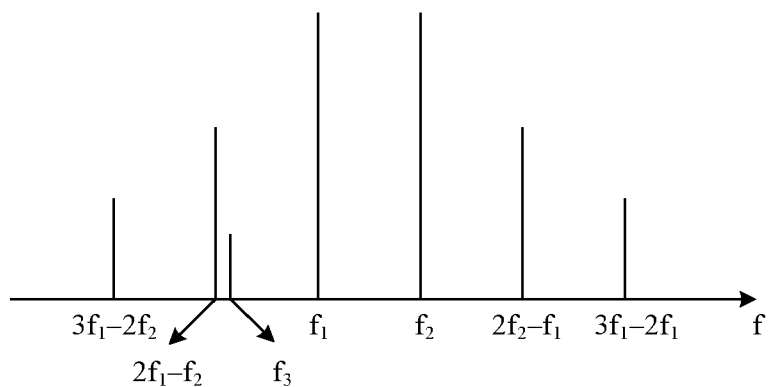
FIG. 4 is a schematic spectrum diagram of interference from a passive intermodulation signal according to an embodiment of this application.

In an actual communications system, FIG. 4 is a schematic spectrum diagram of interference from a passive intermodulation signal. Refer to FIG. 4. When a downlink carrier 1 whose center frequency is $f_1$ and a downlink carrier 2 whose center frequency is $f_2$ are interacted, passive intermodulation signals whose center frequencies are $\pm m^*f_1 \pm n^*f_2$ are generated. For example, a passive intermodulation signal whose center frequency is $2f_1-f_2$ is generated. If a passive intermodulation signal whose center frequency is $2f_1-f_2$ and an uplink carrier whose center frequency is $f_3$ have a mutually overlapping spectrum on a frequency band, the passive intermodulation signal falls into a receive frequency band of an uplink receiver and interferes with a target uplink signal. Consequently, communication quality deteriorates due to the interference.

This application is intended to provide a scheduling method applied to a wireless communications system (collectively referred to as a multi-antenna wireless communications system) using a multiple-input multiple-output (multiple-input multiple-output, MIMO) or massive MIMO technology. Resource scheduling is performed in two dimensions: a dimension of frequency domain resource and a dimension of a space domain resource, to effectively improve an effect of suppressing interference from a passive intermodulation signal in the multi-antenna wireless communications system.

The following describes a specific embodiment of this application with reference to the communications system shown in FIG. 1.

Figure 5:
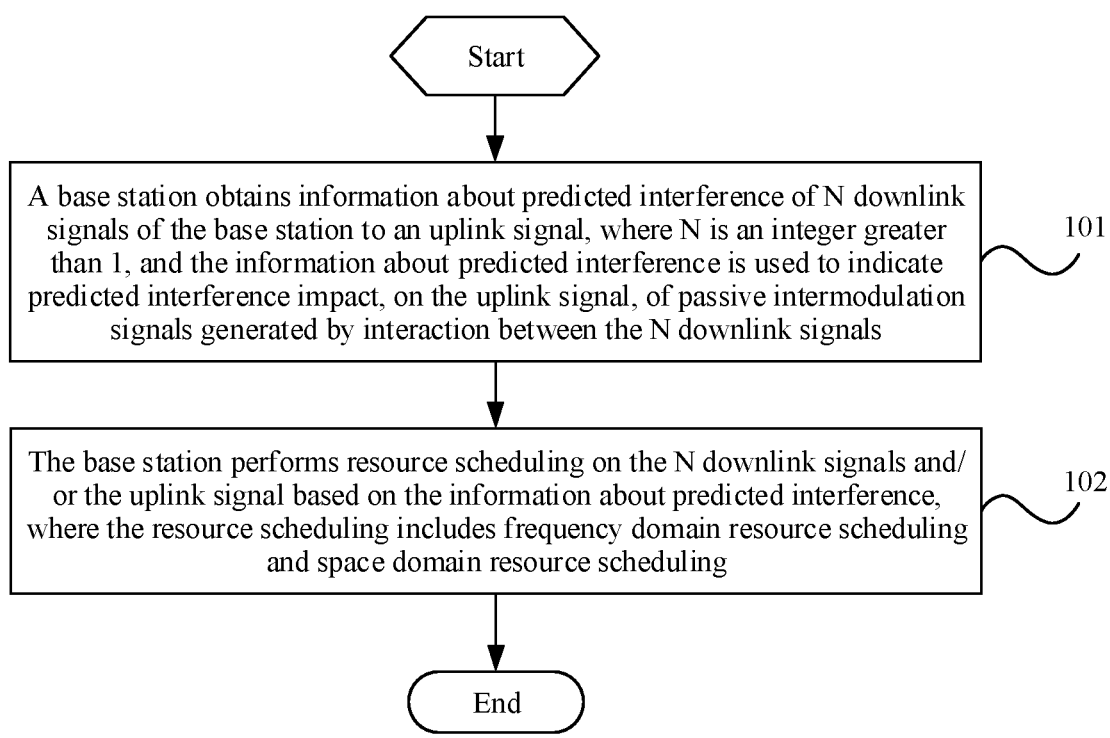
FIG. 5 is a first schematic flowchart of a scheduling method according to an embodiment of this application.

Scenario 1:

With reference to FIG. 1, FIG. 5 is a schematic flowchart of a scheduling method according to an embodiment of this application. FIG. 5 includes the following steps.

Step 101: A base station obtains information about predicted interference of N downlink signals of the base station to an uplink signal, where N is an integer greater than 1, and the information about predicted interference is used to indicate predicted interference impact, on the uplink signal, of passive intermodulation signals generated by interaction between the N downlink signals.

In this embodiment of this application, the N downlink signals of the base station are downlink signals sent by the base station to a terminal (which may be the terminal 200 and/or the terminal 300 in FIG. 1). N is completely configured when the base station is initialized. For example, N may be determined by an operator based on an actual system configuration, or may be defined by a system by default. For example, N may be any integer greater than 1, for example, 2 or 3. It should be noted that a larger value of N indicates a more complex process of obtaining the information about predicted interference of the N downlink signals to the uplink signal.

Still referring to FIG. 5 and in this embodiment of this application, the base station may obtain the information about predicted interference of the N downlink signals of the base station to the uplink signal, where the information about predicted interference is a predicted interference result of the interference impact, on the uplink signal, of the passive intermodulation signals generated by the interaction between the N downlink signals. In other words, for the information about predicted interference, only interference of the passive intermodulation signals (caused by the non-ideal factor described above) to the uplink signal is considered, and interference of another external factor (for example, interference of another signal source) to the uplink signal is not considered. The information about predicted interference may be understood as a theoretical result of interference impact of the passive intermodulation signals on the uplink signal when there is no other interference.

In this embodiment of this application, a method for obtaining the information about predicted interference of the N downlink signals to the uplink signal may be as follows: The base station pre-obtains an interference relationship between one or more downlink scheduling unit combinations on carriers corresponding to the N downlink signals and each uplink scheduling unit on a carrier corresponding to the uplink signal, where each downlink scheduling unit combination includes two or more downlink scheduling units on carriers corresponding to two or more downlink signals in the N downlink signals. Then, the base station further obtains, based on the obtained interference relationship, the information about predicted interference of the N downlink signals to the uplink signal. A specific obtaining method is described in detail in a scenario 2. It should be noted that the manner of obtaining the information about predicted interference of the N downlink signals to the uplink signal in the scenario 2 is only one of a plurality of obtaining manners. This is not limited in this application.

Step 102: The base station performs resource scheduling on the N downlink signals and/or the uplink signal based on the information about predicted interference, where the resource scheduling includes frequency domain resource scheduling and space domain resource scheduling.

In this embodiment of this application, after obtaining the information about predicted interference of the N downlink signals of the base station to the uplink signal, the base station may determine an optimal resource scheduling manner based on the obtained information about predicted interference, and perform resource scheduling on the N downlink signals and/or the uplink signal in the determined resource scheduling manner. Optionally, in this embodiment of this application, the uplink signal may be one or more uplink signals sent by the terminal (which may be one or more terminals).

Optionally, in an embodiment, the resource scheduling manner may be: The base station schedules the uplink signal. Correspondingly, the information about predicted interference is predicted interference impact of $n_1$ downlink scheduling units on the uplink signal, where the $n_1$ downlink scheduling units are located on the carriers corresponding to the N downlink signals, and $n_1$ is an integer greater than 1. In other words, the base station may predict the interference impact, on the uplink signal, of the $n_1$ downlink scheduling units on the carriers corresponding to the N downlink signals, and then determine, based on a predicted result, first $m_1$ scheduling units, on the carrier corresponding to the uplink signal, arranged in ascending order of interference impact of passive intermodulation signals generated by the $n_1$ downlink scheduling units, where $m_1$ is an integer greater than or equal to 1. It should be noted that the $n_1$ downlink scheduling units may be determined by the base station based on a terminal requirement. The terminal requirement may be a requirement of one or more terminals for downlink scheduling. This is not limited in this application. Specific details of the resource scheduling manner are described in a scenario 3.

Optionally, in another embodiment, the resource scheduling manner may alternatively be: The base station schedules the downlink signals. Correspondingly, the information about predicted interference is predicted interference impact, on $m_2$ uplink scheduling units, of the passive intermodulation signals generated by interaction between the N downlink signals, where the $m_2$ uplink scheduling units are located on the carrier corresponding to the uplink signal, and $m_2$ is an integer greater than or equal to 1. In other words, the base station may predict the interference impact of the N downlink signals on the $m_2$ uplink scheduling units, and then determine, based on a predicted result, first $n_2$ downlink scheduling units, on the carriers corresponding to the N downlink signals, arranged in ascending order of interference impact on the $m_2$ uplink scheduling units, and $n_2$ is an integer greater than 1. It should be noted that the $m_2$ uplink scheduling units may be determined by the base station based on a terminal requirement. The terminal requirement may be a requirement of one or more terminals for uplink scheduling. This is not limited in this application. Specific details of the resource scheduling manner are described in a scenario 4.

Optionally, in still another embodiment, the resource scheduling manner may alternatively be: The base station schedules the N downlink signals and the uplink signal simultaneously. Correspondingly, the information about predicted interference is predicted interference impact, on $m_3$ uplink scheduling units on the carrier corresponding to the uplink signal, of $n_3$ downlink scheduling units on the carriers corresponding to the N downlink signals. In other words, the base station may predict the interference impact, on the $m_3$ uplink scheduling units on the carrier corresponding to the uplink signal, of the $n_3$ downlink scheduling units on the carriers corresponding to the N downlink signals, and then determine, based on a predicted result, a corresponding resource combination (where the corresponding combination is a combination of the $n_3$ downlink scheduling units and the $m_3$ uplink scheduling units) that has an optimal predicted interference result, to schedule the determined resource combination. Specific details of the resource scheduling manner are described in a scenario 5.

It should be noted that the scheduling unit (including an uplink scheduling unit and a downlink scheduling unit) in this embodiment of this application is a minimum scheduling unit on a carrier corresponding to a signal (an uplink signal or a downlink signal). The minimum scheduling unit may be divided by an operator based on an actual requirement. For example, an uplink scheduling unit is used as an example. An uplink scheduling unit on the carrier corresponding to the uplink signal may be described in two dimensions: a dimension of a frequency domain resource and a dimension of a space domain resource, that is, the uplink scheduling unit occupies a frequency domain resource and a space domain resource on the carrier corresponding to the uplink signal. For example, a position of the frequency domain resource on which the uplink scheduling unit is located (namely, a size of the frequency domain resource, on the carrier corresponding to the uplink signal, occupied by the uplink scheduling unit) may be 10 resource blocks (Resource Block, RB). Division into the scheduling unit on the space domain resource may be understood as follows: Space domain information (it should be noted that the space domain information may be used to indicate a size and a position of a space domain resource, on a carrier corresponding to a downlink signal, occupied by a downlink scheduling unit) of the space domain resource on which the downlink scheduling unit is located includes but is not limited to: a transmit antenna weight, a transmit beam weight, a transmit codebook weight, and the like. That is, a resource block occupied by any downlink scheduling unit on the space domain resource may be represented by a value such as the transmit antenna weight. Similarly, a size and a position of the space domain resource on which the uplink scheduling unit is located may be represented by a receive antenna weight, a receive beam weight, or the like of the base station. It should be noted that, the transmit antenna weight is a weight value corresponding to each antenna when at least two transmit antennas of the base station send a downlink scheduling unit; and the receive antenna weight is a weight value corresponding to each antenna when at least two receive antennas of the base station receive a scheduling unit. A frequency domain resource and a space domain resource that correspond to a single scheduling unit may also be divided based on an actual requirement. For example, a minimum unit of the space domain resource corresponding to the scheduling unit may be divided based on a weight value. A specific division manner may be set based on an actual requirement. This is not limited in this application. Clearly, in this embodiment of this application, when the base station schedules the $n_1$, $n_2$, or $n_3$ downlink scheduling units in the N downlink signals (or the $m_1$, $m_2$, or $m_3$ uplink scheduling units in the uplink signal), the base station schedules frequency domain resources and space domain resources of the signals.

Optionally, in still another embodiment, the base station in this embodiment of this application may further perform spatial filtering on a received target uplink signal. The target uplink signal may include a desired signal sent by the terminal and an interference signal generated by the passive intermodulation signals. The terminal may be the terminal 200 and/or the terminal 300 in FIG. 1. In addition, the target uplink signal is an uplink signal that is interfered by the passive intermodulation signals generated by interaction between the N downlink signals in this embodiment of this application. For example, when sending the N downlink signals, the base station receives an uplink signal sent by one or more terminals. In this case, this type of uplink signal is interfered by the passive intermodulation signals, that is, the uplink signal is an object (namely, the target uplink signal) on which spatial filtering is performed in this embodiment. In other words, the target uplink signal includes but is not limited to a desired signal part and an interference signal part. The interference signal part is a signal affected by the interference from the passive intermodulation signals. The target uplink signal further includes another interference signal, for example, an inter-cell interference signal. In this embodiment, spatial filtering is performed on the target uplink signal, to further improve an effect of suppressing the interference from the passive intermodulation signals. It should be noted that the desired signal sent by the terminal may be sent by the terminal to the base station based on a resource scheduling result of the uplink signal, or the desired signal sent by the terminal may be an uplink signal irrelevant to the scheduling solution of this application. In other words, the desired signal sent by the terminal may be an uplink signal in a current technology, namely, an uplink signal on which resource scheduling is not performed by using the technical solutions in this embodiment of this application. In this application, spatial filtering may be performed on any uplink signal having a dimension of a space domain resource by using the spatial filtering method in this application. Specific details of spatial filtering are described in a scenario 6.

The interference impact of the N downlink signals of the base station on the uplink signal is predicted, so that an optimal resource scheduling manner can be determined. In addition, a frequency domain resource and a space domain resource are scheduled, so that resource utilization is improved, and the interference from the passive intermodulation signals is effectively suppressed.

Figure 6:
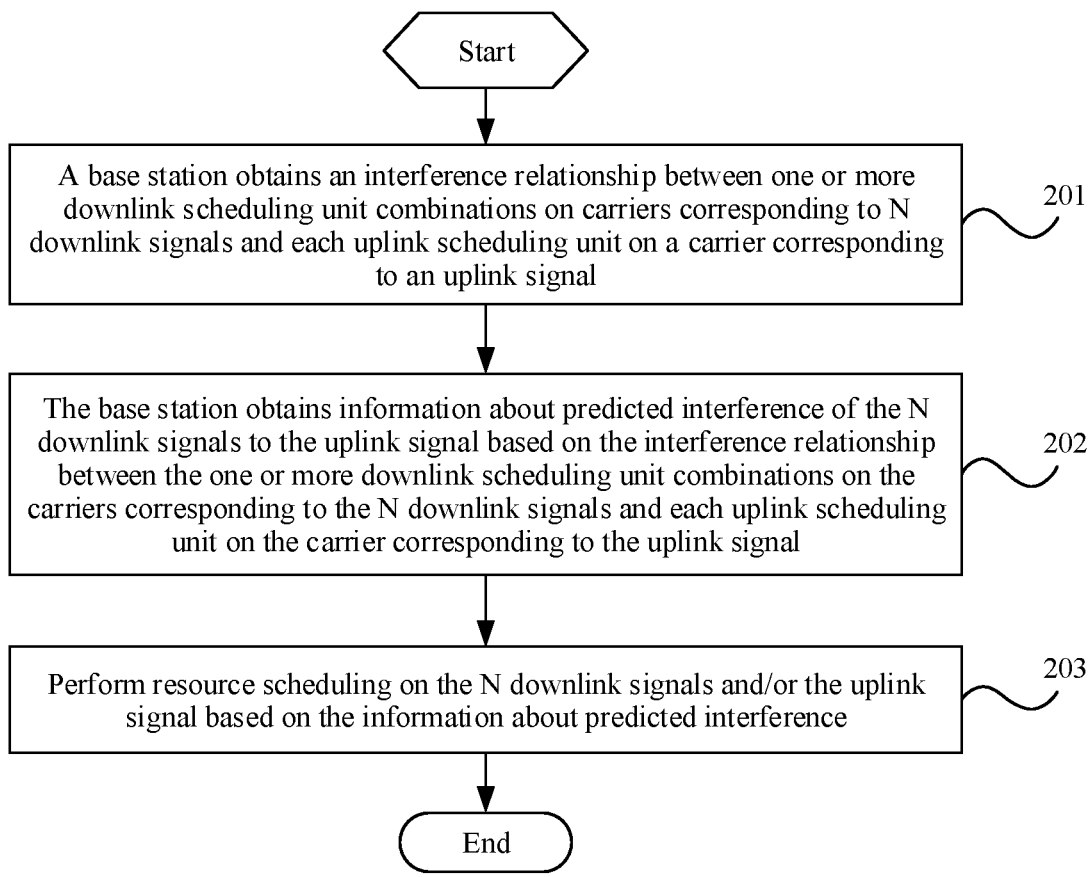
FIG. 6 is a second schematic flowchart of a scheduling method according to an embodiment of this application.

Scenario 2:

With reference to FIG. 1, FIG. 6 is a schematic flowchart of a scheduling method according to an embodiment of this application. FIG. 6 includes the following steps.

Step 201: A base station obtains an interference relationship between one or more downlink scheduling unit combinations on carriers corresponding to N downlink signals and each uplink scheduling unit on a carrier corresponding to an uplink signal.

In this embodiment of this application, each downlink scheduling unit combination includes two or more downlink scheduling units on carriers corresponding to two or more downlink signals in the N downlink signals.

In this embodiment of this application, an operator may set, based on an actual requirement, a resource (including a frequency domain resource and a space domain resource) occupied by a single scheduling unit. A size of a downlink scheduling unit may be the same as or different from a size of an uplink scheduling unit. This is not limited in this application.

Then, the base station may divide, based on a set size of the resource occupied by the scheduling unit, frequency domain resources and space domain resources that correspond to the N downlink signals of the base station, and divide a frequency domain resource and a space domain resource that correspond to the uplink signal. That is, the base station divides, based on the size of the resource occupied by the scheduling unit, each downlink signal into a set including a plurality of downlink scheduling units. For example, a downlink signal 1 may be divided into four downlink scheduling units based on sizes of resources occupied by the downlink scheduling units, to form a downlink resource set 1 {downlink scheduling unit 1, downlink scheduling unit 2, downlink scheduling unit 3, downlink scheduling unit 4}. Similarly, a downlink signal 2 is divided to form a downlink resource set 2 {downlink scheduling unit 5, downlink scheduling unit 6, downlink scheduling unit 7, downlink scheduling unit 8}. The foregoing labeling of the downlink scheduling units is merely for better distinguishing between scheduling units in the downlink signals. Correspondingly, the base station may further divide the uplink signal based on sizes of resources occupied by uplink scheduling units, that is, an uplink resource set corresponding to the uplink signal may be {uplink scheduling unit 1, uplink scheduling unit 2, uplink scheduling unit 3, uplink scheduling unit 4}.

In this embodiment of this application, a scheduling unit in each resource set may alternatively be represented in a dimension of a frequency domain resource and a dimension of a space domain resource. A dimension of a frequency domain resource corresponding to each downlink scheduling unit may be represented by dfs, and a dimension of a space domain resource corresponding to each downlink scheduling unit may be represented by dss. A dimension of a frequency domain resource corresponding to each uplink scheduling unit may be represented by ufs, and a dimension of a space domain resource corresponding to each uplink scheduling unit may be represented by uss. For example, for the downlink resource set 1 {downlink scheduling unit 1, downlink scheduling unit 2, downlink scheduling unit 3, downlink scheduling unit 4}, the downlink scheduling unit 1 may include (dfs1, dss1), where dfs1 is used to indicate a frequency domain resource position of the downlink scheduling unit 1, and dss1 is used to indicate a space domain resource position of the downlink scheduling unit 1. The downlink scheduling unit 2 includes (dfs1, dss2), where dfs1 is used to indicate a frequency domain resource position of the downlink scheduling unit 2, and dss2 is used to indicate a space domain resource position of the downlink scheduling unit 2. Clearly, the downlink scheduling unit 1 and the downlink scheduling unit 2 are located on different space domain resources at a same frequency domain resource position. The downlink scheduling unit 3 includes (dfs2, dss2). Clearly, the downlink scheduling unit 3 and the downlink scheduling unit 2 are located on different frequency domain resources at a same space domain resource position, and the downlink scheduling unit 3 and the downlink scheduling unit 1 are located on different frequency domain resources at different space domain resource positions. The downlink scheduling unit 4 includes (dfs2, dss1). Clearly, the downlink scheduling unit 4 and the downlink scheduling unit 3 are located on different space domain resources at a same frequency domain resource position, the downlink scheduling unit 4 and the downlink scheduling unit 2 are located on different frequency domain resources at different space domain resource positions, and the downlink scheduling unit 4 and the downlink scheduling unit 1 are located on different frequency domain resources at a same space domain resource position. That is, elements (namely, downlink scheduling units) in the downlink resource set corresponding to the downlink signal 1 form a set of all downlink scheduling units that may include a frequency domain resource and a space domain resource of the downlink signal 1.

Optionally, in an embodiment, each resource set may be obtained in a plurality of manners. The following uses one of the manners as an example for description. An example of obtaining the downlink resource set 1 is used.

(1) A frequency domain resource corresponding to the downlink signal is divided to form a corresponding downlink frequency domain resource set 1.

Specifically, division is still performed based on a specified size of a frequency domain resource corresponding to the minimum scheduling unit. For example, the frequency domain resource corresponding to the downlink signal may be divided into two minimum frequency domain scheduling units, to form the downlink frequency domain resource set 1. For example, the downlink frequency domain resource set 1 may be {dfs1, dfs2}. Elements in the downlink frequency domain resource set are merely examples, and are actually not specifically labeled.

(2) A space domain resource corresponding to the downlink signal is divided to form a corresponding downlink space domain resource set 1.

Specifically, division is still performed based on a specified size of a space domain resource corresponding to the minimum scheduling unit. For example, the space domain resource corresponding to the downlink signal may be divided into two minimum space domain scheduling units, to form the downlink space domain resource set 1. For example, the downlink space domain resource set 1 may be {dss1, dss2}. Elements in the downlink space domain resource set are merely examples, and are actually not specifically labeled.

(3) The downlink resource set 1 is formed based on the downlink frequency domain resource set 1 and the downlink space domain resource set 2.

Specifically, in this embodiment of this application, a manner of forming the downlink resource set 1 is combining any one of the elements in the downlink frequency domain resource set 1 with any one of the elements in the downlink space domain resource set 2.

For example, still using the downlink frequency domain resource set 1 and the downlink space domain resource set 1 as an example, the formed downlink resource set 1 may be {(dfs1, dss1), (dfs1, dss2), (dfs2, dss1), (dfs2, dss2)}.

Similarly, for a manner of dividing a resource corresponding to another downlink signal and a manner of dividing a resource corresponding to the uplink signal, refer to the foregoing steps.

In this embodiment of this application, the interference relationship between the one or more downlink scheduling unit combinations on the carriers corresponding to the N downlink signals of the base station and each uplink scheduling unit on the carrier corresponding to the uplink signal may be represented in a plurality of manners. An interference information table may be created, and the one or more downlink scheduling unit combinations on the carriers corresponding to the N downlink signals and each uplink scheduling unit on the carrier corresponding to the uplink signal are correspondingly written into the interference information table, so that the interference relationship between the one or more downlink scheduling unit combinations on the carriers corresponding to the N downlink signals of the base station and each uplink scheduling unit on the carrier corresponding to the uplink signal is intuitively reflected in the table. It should be noted that, in this embodiment of this application, the carrier corresponding to the downlink signal or the carrier corresponding to the uplink signal is a resource in two dimensions, namely, dimensions of a frequency domain resource and a space domain resource that correspond to the downlink signal or the uplink signal.

The following describes in detail a step of creating the interference information table.

Specifically, it is assumed that N=2 downlink signals are set on a base station side (to distinguish between an actually sent downlink signal and a received uplink signal, a carrier corresponding to a downlink signal in a procedure of obtaining the information about predicted interference on the base station side and a carrier corresponding to a downlink signal in the following embodiment are both referred to as downlink carriers below, and a carrier corresponding to an uplink signal in the procedure of obtaining the information about predicted interference on the base station side and a carrier corresponding to an uplink signal in the following embodiment are both referred to as uplink carriers below).

(1) Create an interference information table.

Specifically, in this embodiment of this application, for N=2 downlink carriers of the base station, an interference information table may be generated for any uplink carrier. For example, assuming that M=3 uplink carriers (including an uplink carrier 1, an uplink carrier 2, and an uplink carrier 3) are set on the base station side, an interference information table is created for the uplink carrier 1, the uplink carrier 2, and the uplink carrier 3.

In this embodiment of this application, interference information tables created for uplink carriers corresponding to different downlink carriers may be named to distinguish between the interference information tables. For example, the interference information table may be named TabDLabc . . . Ulq, where abc . . . are scheduled downlink scheduling units, and q is q uplink signals affected by passive intermodulation signals generated by interaction between the downlink scheduling units abc . . . . For example, if a quantity N of downlink carriers is 2 and a quantity M of uplink carriers is 3, an interference information table TabDLabUL3 may be created.

The following uses an example in which a downlink frequency domain resource set 1 corresponding to a downlink carrier 1 is {dfs1, dfs2}, a downlink space domain resource set corresponding to the downlink carrier 1 is {dss1, dss2}, a downlink frequency domain resource set 2 corresponding to a downlink carrier 2 is {dfs3, dfs4}, a downlink space domain resource set corresponding to the downlink carrier 2 is {dss3, dss4}, an uplink frequency domain resource set corresponding to an uplink carrier is {ufs1, ufs2}, and an uplink space domain resource set corresponding to the uplink carrier is {uss1, uss2} for detailed description. It should be noted that, in this embodiment of this application, the interference information table is created by using only an example in which the uplink carrier has four uplink scheduling units, or the base station has the uplink carrier 1, that is, an uplink scheduling unit set is {(ufs1, uss1), (ufs1, uss2), (ufs2, uss1), (ufs2, uss1)}. However, in another embodiment, the uplink scheduling unit set may be a set of all uplink scheduling units on a plurality of uplink carriers. For example, if there is an uplink carrier 1 {(ufs1, uss1), (ufs1, uss2), (ufs2, uss1), (ufs2, uss1)} and an uplink carrier 2 {(ufs3, uss3), (ufs3, uss4), (ufs4, uss3), (ufs4, uss4)}, the uplink scheduling unit set is a union set of the uplink carrier 1 and the uplink carrier 2. That is, when the interference information table is created, information about interference of each downlink scheduling unit combination to the uplink scheduling units (including all uplink scheduling units on the uplink carrier 1 and the uplink carrier 2) is obtained.

As shown in Table 1, an interference information table TabDLabUL1 corresponding to the downlink carrier 1, the downlink carrier 2, and the uplink carrier 1 is created based on the elements in the foregoing set.

TABLE 1

| Sequence number | dfsa | dssa | dfsb | dssb | ufs | uss | Information about interference |
|---|---|---|---|---|---|---|---|
| 1 | dfs1 | dss1 | dfs3 | dss3 | ufs1 | uss1 | |
| | | | | | ufs1 | uss2 | |
| | | | | | ufs2 | uss1 | |
| | | | | | ufs2 | uss2 | |
| 2 | dfs1 | dss1 | dfs3 | dss4 | ufs1 | uss1 | |
| | | | | | ufs1 | uss2 | |
| | | | | | ufs2 | uss1 | |
| | | | | | ufs2 | uss2 | |
| 3 | dfs1 | dss1 | dfs4 | dss3 | ufs1 | uss1 | |
| | | | | | ufs1 | uss2 | |
| | | | | | ufs2 | uss1 | |
| | | | | | ufs2 | uss2 | |
| 4 | dfs1 | dss1 | dfs4 | dss4 | ufs1 | uss1 | |
| | | | | | ufs1 | uss2 | |
| | | | | | ufs2 | uss1 | |
| | | | | | ufs2 | uss2 | |
| 5 | dfs1 | dss2 | dfs3 | dss3 | ufs1 | uss1 | |
| | | | | | ufs1 | uss2 | |
| | | | | | ufs2 | uss1 | |
| | | | | | ufs2 | uss2 | |
| 6 | dfs1 | dss2 | dfs3 | dss4 | ufs1 | uss1 | |
| | | | | | ufs1 | uss2 | |
| | | | | | ufs2 | uss1 | |
| | | | | | ufs2 | uss2 | |
| 7 | dfs1 | dss2 | dfs4 | dss3 | ufs1 | uss1 | |
| | | | | | ufs1 | uss2 | |
| | | | | | ufs2 | uss1 | |
| | | | | | ufs2 | uss2 | |
| 8 | dfs1 | dss2 | dfs4 | dss4 | ufs1 | uss1 | |
| | | | | | ufs1 | uss2 | |
| | | | | | ufs2 | uss1 | |
| | | | | | ufs2 | uss2 | |
| 9 | dfs2 | dss1 | dfs3 | dss3 | ufs1 | uss1 | |
| | | | | | ufs1 | uss2 | |
| | | | | | ufs2 | uss1 | |
| | | | | | ufs2 | uss2 | |
| 10 | dfs2 | dss1 | dfs3 | dss4 | ufs1 | uss1 | |
| | | | | | ufs1 | uss2 | |
| | | | | | ufs2 | uss1 | |
| | | | | | ufs2 | uss2 | |
| 11 | dfs2 | dss1 | dfs4 | dss3 | ufs1 | uss1 | |
| | | | | | ufs1 | uss2 | |
| | | | | | ufs2 | uss1 | |
| | | | | | ufs2 | uss2 | |
| 12 | dfs2 | dss1 | dfs4 | dss4 | ufs1 | uss1 | |
| | | | | | ufs1 | uss2 | |
| | | | | | ufs2 | uss1 | |
| | | | | | ufs2 | uss2 | |
| 13 | dfs2 | dss2 | dfs3 | dss3 | ufs1 | uss1 | |
| | | | | | ufs1 | uss2 | |
| | | | | | ufs2 | uss1 | |
| | | | | | ufs2 | uss2 | |
| 14 | dfs2 | dss2 | dfs3 | dss4 | ufs1 | uss1 | |
| | | | | | ufs1 | uss2 | |
| | | | | | ufs2 | uss1 | |
| | | | | | ufs2 | uss2 | |
| 15 | dfs2 | dss2 | dfs4 | dss3 | ufs1 | uss1 | |
| | | | | | ufs1 | uss2 | |
| | | | | | ufs2 | uss1 | |
| | | | | | ufs2 | uss2 | |
| 16 | dfs2 | dss2 | dfs4 | dss4 | ufs1 | uss1 | |
| | | | | | ufs1 | uss2 | |
| | | | | | ufs2 | uss1 | |
| | | | | | ufs2 | uss2 | |

As shown in Table 1, in the interference information table TabDLabUL1 (uss, ufs, dfsa, dssa, dfsb, dfsb), dfsa is an element index of the downlink frequency domain resource set 1, dssa is an element index of the downlink space domain resource set 1, dfsb is an element index of the downlink frequency domain resource set 2, and dssb is an element index of the downlink space domain resource set 2. For example, (dfs1, dss1) may be used to identify the downlink scheduling unit 1 corresponding to the downlink carrier 1; (dfs1, dss2) may be used to identify the downlink scheduling unit 2 corresponding to the downlink carrier 1; (dfs2, dss1) may be used to identify the downlink scheduling unit 3 corresponding to the downlink carrier 1; (dfs2, dss2) may be used to identify the downlink scheduling unit 4 corresponding to the downlink carrier 1; (dfs3, dss3) may be used to identify the downlink scheduling unit 5 corresponding to the downlink carrier 2; (dfs3, dss4) may be used to identify the downlink scheduling unit 6 corresponding to the downlink carrier 2; (dfs4, dss3) may be used to identify the downlink scheduling unit 7 corresponding to the downlink carrier 2; and (dfs4, dss4) may be used to identify the downlink scheduling unit 8 corresponding to the downlink carrier 2. Therefore, the $1^{st}$ downlink scheduling unit combination ((dfs1, dss1), (dfs3, dss3)) in Table 1 may identify a downlink scheduling unit combination including the downlink scheduling unit 1 that corresponds to the frequency domain resource position dfs1 and the space domain resource position dss1 on the downlink carrier 1 and the downlink scheduling unit 5 that corresponds to the frequency domain resource position dfs3 and the space domain resource position dss3 on the downlink carrier 2. In other words, Table 1 lists all combinations of any one of the downlink scheduling units on the downlink carrier 1 and any one of the downlink scheduling units on the downlink carrier 2.

(2) Obtain a corresponding passive intermodulation signal based on each downlink scheduling unit combination.

Specifically, in this embodiment of this application, the base station may traverse all downlink scheduling unit combinations in Table 1, to obtain a passive intermodulation signal corresponding to each downlink scheduling unit combination.

For example, the $1^{st}$ downlink scheduling unit combination ((dfs1, dss1), (dfs3, dss3)) in Table 1 is used as an example. The base station schedules the $1^{st}$ downlink scheduling unit combination. Optionally, in an embodiment, a scheduling manner may be: sending the downlink carrier 1 and the downlink carrier 2, where downlink scheduling units other than the downlink scheduling unit 1 indicated by (dfs1, dss1) on the downlink carrier 1 and the downlink scheduling unit 5 indicated by (dfs3, dss3) on the downlink carrier 2 are all set to 0.

Then, the base station receives the passive intermodulation signal. It should be noted that, in this embodiment of this application, an uplink signal received after the base station sends the $1^{st}$ downlink scheduling unit combination may be used as the passive intermodulation signal.

(3) Determine information about interference to each uplink scheduling unit based on the passive intermodulation signal.

Specifically, in this embodiment of this application, the base station may calculate, based on the obtained passive intermodulation signal, information about interference of each downlink scheduling unit combination to each uplink scheduling unit on the uplink carrier. The information about interference may be information, such as interference power or interference energy, that is used to indicate a magnitude of interference impact, on the uplink signal, of the passive intermodulation signals generated by interaction between the downlink signals. For an orthogonal frequency division multiplexing (Orthogonal Frequency Division Multiplexing, OFDM) system, a manner of calculating the information about predicted interference may be as follows:

First, it is defined that a frequency domain resource indicated by ufs includes K subcarriers, and any one of the subcarriers is indicated by using an index k. In this embodiment of this application, a quantity of receive antennas of the base station is R. Therefore, passive intermodulation (Passive Intermodulation, PIM) interference to the base station on the subcarrier k is $x_k=[x_{k1}, x_{k2}, \ldots, x_{kR}]^T$. That is, the subcarrier k is received by R antennas, and PIM interference to each of the R antennas is represented by $x_{kR}$. If a space domain resource weight indicated by uss is $w=[w_1, w_2, \ldots, w_R]^T$, a passive intermodulation signal, on the subcarrier k, indicated by uss is $r_k=w^T*w_k$, and passive intermodulation power corresponding to the subcarrier k is $P_k=|r_k|^2$ so that an average value of passive intermodulation power of all subcarriers indicated by ufs is calculated as information, about predicted interference, of an uplink scheduling unit indicated by (ufs, uss), that is, $$p = \frac{1}{K}\Sigma_{k=1}^{K} P_k.$$

Interference impact (namely, information about interference in the table) of the $1^{st}$ downlink scheduling unit combination on each uplink scheduling unit in the uplink scheduling unit 1 (ufs1, uss1), the uplink scheduling unit 2 (ufs1, uss2), the uplink scheduling unit 3 (ufs2, uss1), and the uplink scheduling unit 4 (ufs2, uss2) may be obtained by using the foregoing calculation method.

Then, all the downlink scheduling unit combinations in Table 1 are traversed, that is, the downlink scheduling unit combinations in Table 1 are sent one by one, and information about interference of each downlink scheduling unit combination to each uplink scheduling unit on the uplink carrier is obtained and is filled in Table 1. Table 2 lists an interference relationship between each downlink scheduling unit combination and each scheduling unit on the uplink carrier.

TABLE 2

| Sequence number | dfsa | dssa | dfsb | dssb | ufs | uss | Information about interference |
|---|---|---|---|---|---|---|---|
| 1 | dfs1 | dss1 | dfs3 | dss3 | ufs1 | uss1 | p1 |
|   |      |      |      |      | ufs1 | uss2 | p2 |
|   |      |      |      |      | ufs2 | uss1 | p3 |
|   |      |      |      |      | ufs2 | uss2 | p4 |
| 2 | dfs1 | dss1 | dfs3 | dss4 | ufs1 | uss1 | p5 |
|   |      |      |      |      | ufs1 | uss2 | p6 |
|   |      |      |      |      | ufs2 | uss1 | p7 |
|   |      |      |      |      | ufs2 | uss2 | p8 |
| 3 | dfs1 | dss1 | dfs4 | dss3 | ufs1 | uss1 | p9 |
|   |      |      |      |      | ufs1 | uss2 | p10 |
|   |      |      |      |      | ufs2 | uss1 | p11 |
|   |      |      |      |      | ufs2 | uss2 | p12 |
| 4 | dfs1 | dss1 | dfs4 | dss4 | ufs1 | uss1 | p13 |
|   |      |      |      |      | ufs1 | uss2 | p14 |
|   |      |      |      |      | ufs2 | uss1 | p15 |
|   |      |      |      |      | ufs2 | uss2 | p16 |
| 5 | dfs1 | dss2 | dfs3 | dss3 | ufs1 | uss1 | p17 |
|   |      |      |      |      | ufs1 | uss2 | p18 |
|   |      |      |      |      | ufs2 | uss1 | p19 |
|   |      |      |      |      | ufs2 | uss2 | p20 |
| 6 | dfs1 | dss2 | dfs3 | dss4 | ufs1 | uss1 | p21 |
|   |      |      |      |      | ufs1 | uss2 | p22 |
|   |      |      |      |      | ufs2 | uss1 | p23 |
|   |      |      |      |      | ufs2 | uss2 | p24 |
| 7 | dfs1 | dss2 | dfs4 | dss3 | ufs1 | uss1 | p25 |
|   |      |      |      |      | ufs1 | uss2 | p26 |
|   |      |      |      |      | ufs2 | uss1 | p27 |
|   |      |      |      |      | ufs2 | uss2 | p28 |

TABLE 2-continued

| Sequence number | dfsa | dssa | dfsb | dssb | ufs | uss | Information about interference |
|---|---|---|---|---|---|---|---|
| 8 | dfs1 | dss2 | dfs4 | dss4 | ufs1 | uss1 | p29 |
|  |  |  |  |  | ufs1 | uss2 | p30 |
|  |  |  |  |  | ufs2 | uss1 | p31 |
|  |  |  |  |  | ufs2 | uss2 | p32 |
| 9 | dfs2 | dss1 | dfs3 | dss3 | ufs1 | uss1 | p33 |
|  |  |  |  |  | ufs1 | uss2 | p34 |
|  |  |  |  |  | ufs2 | uss1 | p35 |
|  |  |  |  |  | ufs2 | uss2 | p36 |
| 10 | dfs2 | dss1 | dfs3 | dss4 | ufs1 | uss1 | p37 |
|  |  |  |  |  | ufs1 | uss2 | p38 |
|  |  |  |  |  | ufs2 | uss1 | p39 |
|  |  |  |  |  | ufs2 | uss2 | p40 |
| 11 | dfs2 | dss1 | dfs4 | dss3 | ufs1 | uss1 | p41 |
|  |  |  |  |  | ufs1 | uss2 | p42 |
|  |  |  |  |  | ufs2 | uss1 | p43 |
|  |  |  |  |  | ufs2 | uss2 | p44 |
| 12 | dfs2 | dss1 | dfs4 | dss4 | ufs1 | uss1 | p45 |
|  |  |  |  |  | ufs1 | uss2 | p46 |
|  |  |  |  |  | ufs2 | uss1 | p47 |
|  |  |  |  |  | ufs2 | uss2 | p48 |
| 13 | dfs2 | dss2 | dfs3 | dss3 | ufs1 | uss1 | p49 |
|  |  |  |  |  | ufs1 | uss2 | p50 |
|  |  |  |  |  | ufs2 | uss1 | p51 |
|  |  |  |  |  | ufs2 | uss2 | p52 |
| 14 | dfs2 | dss2 | dfs3 | dss4 | ufs1 | uss1 | p53 |
|  |  |  |  |  | ufs1 | uss2 | p54 |
|  |  |  |  |  | ufs2 | uss1 | p55 |
|  |  |  |  |  | ufs2 | uss2 | p56 |
| 15 | dfs2 | dss2 | dfs4 | dss3 | ufs1 | uss1 | p57 |
|  |  |  |  |  | ufs1 | uss2 | p58 |
|  |  |  |  |  | ufs2 | uss1 | p59 |
|  |  |  |  |  | ufs2 | uss2 | p60 |
| 16 | dfs2 | dss2 | dfs4 | dss4 | ufs1 | uss1 | p61 |
|  |  |  |  |  | ufs1 | uss2 | p62 |
|  |  |  |  |  | ufs2 | uss1 | p63 |
|  |  |  |  |  | ufs2 | uss2 | p64 |

The foregoing interference information table is created by using only an example in which N=2. In this embodiment of this application, N may be a positive integer greater than 1. For example, when N=3, the base station may create interference information tables TabDlabcUl1 (ufs, uss, dfsa, dssa, dfsb, dssb, dfsc, dssc) TabDlabUl1 (ufs, uss, dfsa, dssa, dfsb, dssb), TabDlacUl1 (ufs, uss, dfsa, dssa, dfsc, dssc), and TabDlbcUl1 (ufs, uss, dfsb, dssb, dfsc, dssc), where dfsa is an element index in a downlink frequency domain resource set corresponding to the downlink carrier 1, dfsb is an element index in a downlink frequency domain resource set corresponding to the downlink carrier 2, dfsc is an element index in a downlink frequency domain resource set corresponding to the downlink carrier 3, dssa is an element index in a downlink space domain resource set corresponding to the downlink carrier 1, dssb is an element index in a downlink space domain resource set corresponding to the downlink carrier 2, and dssc is an element index in a downlink space domain resource set corresponding to the downlink carrier 3. Complete tables TabDlabcUl1, TabDlabUl1, TabDlacUl1, and TabDlbcUl1 may be obtained in the foregoing manner of generating the interference information table.

Optionally, in an embodiment, the information about predicted interference in the interference information table TabDlabcUl1 may be calculated according to the following formula (1):

$$TabDlabcUlq\ (ufs, uss, dfsa, dssa, dfsb, dssb, dfsc, dssc) = \qquad (1)$$
$$\left(\frac{1}{K}\sum\nolimits_{k=1}^{K} p_k\right) - TabDlabUlq\ (ufs, uss, dfsa, dssa, dfsb, dssb) -$$
$$TabDlacUlq\ (ufs, uss, dfsa, dssa, dfsc, dssc) -$$
$$TabDlbcUlq\ (ufs, uss, dfsb, dssb, dfsc, dssc)$$

That is, interference impact of each downlink scheduling unit combination on each uplink scheduling unit in TabDl123Ulq is caused by a PIM signal jointly generated by the downlink scheduling units on the downlink carrier 1, the downlink carrier 2, and the downlink carrier 3, and does not include interference impact caused only by a PIM signal generated by the downlink carrier 1 and the downlink carrier 2, the downlink carrier 1 and the downlink carrier 3, or the downlink carrier 2 and the downlink carrier 3.

Step 202: The base station obtains the information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

Specifically, in this embodiment of this application, based on an actual scheduling requirement (namely, downlink signal scheduling and/or uplink signal scheduling) and the interference relationship, obtained in step 201, between the one or more downlink scheduling unit combinations on the carriers corresponding to the N downlink signals and each uplink scheduling unit on the carrier corresponding to the uplink signal, the base station may obtain the information about predicted interference, to the uplink signal, of the N downlink signals sent by the base station.

Optionally, in an embodiment, if the base station may determine, based on a terminal requirement, one or more downlink scheduling unit combinations that need to be scheduled, the base station may obtain, according to the interference information table, information about predicted interference (namely, predicted interference impact), to each uplink scheduling unit of the uplink signal, of the downlink scheduling unit combinations that need to be scheduled. A specific obtaining manner is described in detail in the scenario 3.

Optionally, in an embodiment, if the base station may determine, based on a terminal requirement, an uplink scheduling unit combination that is to be received by the base station, the base station may obtain, according to the interference information table, information about predicted interference of each downlink scheduling unit combination to the to-be-received uplink scheduling unit combination. A specific obtaining manner is described in detail in the scenario 4.

Optionally, in an embodiment, the base station may arbitrarily determine a scheduling combination corresponding to a downlink scheduling unit combination and an uplink scheduling unit combination, and obtain, according to an interference information table, information about predicted interference corresponding to the scheduling combination. A specific obtaining manner is described in detail in the scenario 5.

Step 203: Perform resource scheduling on the N downlink signals and/or the uplink signal based on the information about predicted interference.

Scenario 3

Figure 7:
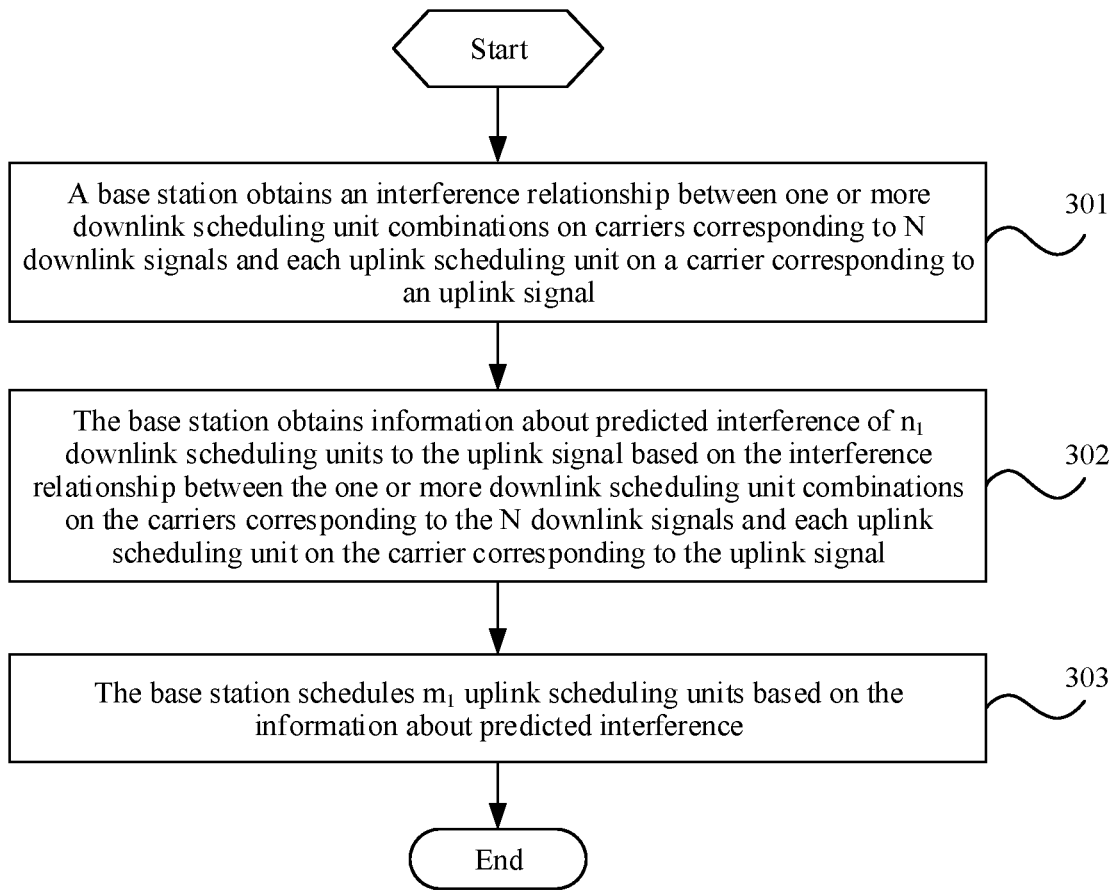
FIG. 7 is a third schematic flowchart of a scheduling method according to an embodiment of this application.

With reference to FIG. 1, FIG. 7 is a schematic flowchart of a scheduling method according to an embodiment of this application. FIG. 7 includes the following steps.

Step 301: A base station obtains an interference relationship between one or more downlink scheduling unit combinations on carriers corresponding to N downlink signals and each uplink scheduling unit on a carrier corresponding to an uplink signal.

For specific details, refer to step 201.

Step 302: The base station obtains information about predicted interference of $n_1$ downlink scheduling units to the uplink signal based on the interference relationship between the one or more downlink scheduling unit combinations on the carriers corresponding to the N downlink signals and each uplink scheduling unit on the carrier corresponding to the uplink signal.

Specifically, in this embodiment of this application, the base station may predict interference impact, on the uplink signal, of the $n_1$ downlink scheduling units on the carriers corresponding to the N downlink signals, and then determine, based on a predicted result, first $m_1$ scheduling units, on the carrier corresponding to the uplink signal, arranged in ascending order of interference impact of passive intermodulation signals generated by the $n_1$ downlink scheduling units, where $m_1$ is an integer greater than or equal to 1. It should be noted that the $n_1$ downlink scheduling units may be determined by the base station based on a terminal requirement. The terminal requirement may be a requirement of one or more terminals for downlink scheduling.

To make a person skilled in the art better understand a process in which the base station obtains predicted interference impact of the $n_1$ downlink scheduling units on the uplink signal, the following uses Table 2 in the scenario 2 as an example for detailed description.

(1) The base station determines, based on the terminal requirement, the $n_1$ downlink scheduling units that need to be scheduled.

As shown in Table 2, an interference information table records information about interference of different downlink scheduling unit combinations to each uplink scheduling unit on an uplink carrier.

It should be noted that the $n_1$ downlink scheduling units are located on carriers corresponding to at least two different signals in the N downlink signals. For example, as shown in FIG. 8, the $n_1$ downlink scheduling units include a downlink scheduling unit 1 (dfs1, dss1) and a downlink scheduling unit 3 (dfs2, dss1) on a carrier corresponding to a downlink signal 1, and a downlink scheduling unit 5 (dfs3, dss3) and a downlink scheduling unit 6 (dfs3, dss4) on a carrier corresponding to a downlink signal 2.

(2) Determine a downlink scheduling unit set based on the $n_1$ downlink scheduling units.

Figure 8:
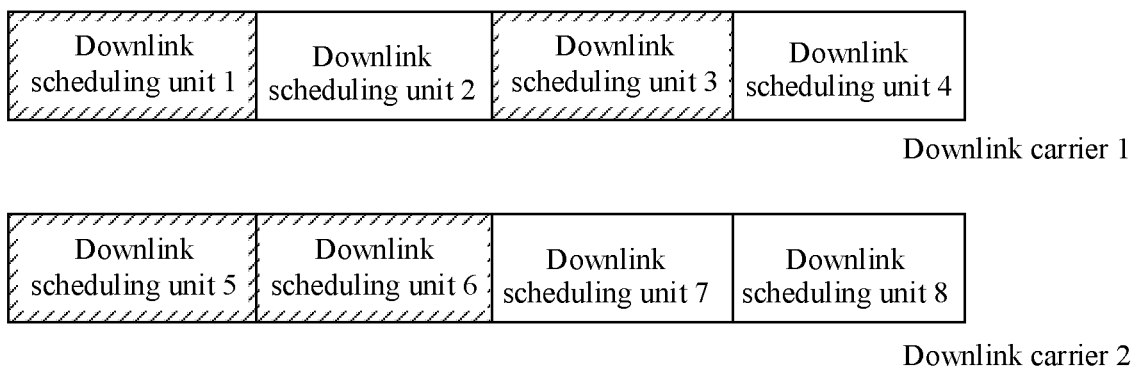
FIG. 8 is a schematic diagram of resource scheduling according to an embodiment of this application.

Specifically, in this embodiment of this application, as shown in FIG. 8, downlink scheduling units scheduled on a base station side include a downlink scheduling unit 1, a downlink scheduling unit 3, a downlink scheduling unit 5, and a downlink scheduling unit 6 (namely, shaded parts in FIG. 8). The foregoing four downlink scheduling units may interact with each other to generate a corresponding PIM signal. Therefore, the downlink scheduling unit set is any combination of the foregoing four scheduling units included in the interference information table.

For example, as shown in Table 2, a combination 1 ((dfs1, dss1), (dfs3, dss3)) indicates a combination of the downlink scheduling unit 1 and the downlink scheduling unit 5; a combination 2 ((dfs1, dss1), (dfs3, dss4)) indicates a combination of the downlink scheduling unit 1 and the downlink scheduling unit 6; a combination 3 ((dfs2, dss1), (dfs3, dss3)) indicates a combination of the downlink scheduling unit 3 and the downlink scheduling unit 5; and a combination 4 ((dfs2, dss1), (dfs3, dss4)) indicates a combination of the downlink scheduling unit 3 and the downlink scheduling unit 6. That is, combinations 1 to 4 list all combinations of the downlink scheduling unit 1, the downlink scheduling unit 3, the downlink scheduling unit 5, and the downlink scheduling unit 6. Therefore, the downlink scheduling unit set is {combination 1, combination 2, combination 3, combination 4}, namely, {((dfs1, dss1), (dfs3, dss3)), ((dfs1, dss1), (dfs3, dss4)), ((dfs2, dss1), (dfs3, dss3)), ((dfs2, dss1), (dfs3, dss4))}.

(3) Obtain information about predicted interference of the downlink scheduling unit set to the uplink signal.

Optionally, in an embodiment, the information about predicted interference may be a sum of information about interference of a downlink scheduling unit combination to each uplink scheduling unit.

Optionally, in another embodiment, the information about predicted interference may alternatively be a ratio of signal power on each uplink scheduling unit to information of interference of the downlink scheduling unit combination to each uplink scheduling unit, namely, a signal-to-interference ratio (Signal-to-Interference Ratio, SIR).

The detailed calculation method is as follows:

a. Obtain signal power Sig on each uplink scheduling unit.

Specifically, an uplink scheduling unit 1 (ufs1, uss1) is used as an example.

The base station may obtain weight information $w=[w_1, w_2, \ldots, w_R]^T$ corresponding to the uplink scheduling unit 1. That is, the base station obtains weight information of the uplink scheduling unit 1 based on a corresponding weight obtained when each of R antennas of the base station receives the uplink scheduling unit 1.

The base station obtains channel response information $h=[h_1, h_2, \ldots, h_R]^T$ corresponding to an uplink scheduling unit 1 of a terminal j.

Sig1 of the uplink scheduling unit 1 is calculated according to a formula (2):

$$\text{Sig}UlqUej(ufs,uss) = |w^T * h|^2 \qquad (2)$$

Sig1 is information about predicted interference (a signal-to-interference ratio) corresponding to an uplink scheduling unit (ufs, uss) on an uplink carrier q of the terminal j.

b. Obtain a sum Int of information about interference to each uplink scheduling unit.

The uplink scheduling unit 1 (ufs1, uss1) is still used as an example.

Specifically, the base station adds, based on the downlink scheduling unit set, information about interference corresponding to entries in Table 2 that successfully match the downlink scheduling unit set, to obtain a sum of information about interference to the uplink scheduling unit 1.

For example, in Table 2, an entry 1 (namely, a sequence number in the table), an entry 2, an entry 9, and an entry 10 all successfully match the downlink scheduling unit set. Then, the base station adds the information about interference (namely, p1, p5, p33, and p37) that corresponds to the uplink scheduling unit 1 and that is in the successfully matched entries, and records a sum of the information about interference as TabDlabUl1 (ufs, uss), to obtain the sum Int1=TabDlabUl1 (ufs, uss) of the information about interference to the uplink scheduling unit.

c. Obtain information Sir about predicted interference to each uplink scheduling unit.

The uplink scheduling unit 1 (ufs1, uss1) is still used as an example.

Specifically, for information about predicted interference to the uplink scheduling unit 1, Sir1=Sig1/Int1.

Based on the foregoing method, Sir of each uplink scheduling unit, namely, information Sir2 about predicted interference corresponding to an uplink scheduling unit 2 (ufs1, uss2), information Sir3 about predicted interference corresponding to an uplink scheduling unit 3 (ufs2, uss1), and information Sir4 about predicted interference corresponding to an uplink scheduling unit 4 (ufs2, uss2), may be obtained.

As shown above, in an embodiment, the information Sir about predicted interference may alternatively be the sum Int of the information about interference. In addition, the information about predicted interference may be calculated in a plurality of manners, and the manners are not limited to the manners listed in this embodiment of this application. A person skilled in the art may select, based on an actual calculation difficulty and an actual requirement, any manner in which predicted interference impact of the $n_1$ downlink scheduling units on an uplink scheduling unit can be obtained.

For example, the information about predicted interference may alternatively be obtained based on information about inter-terminal interference. Specifically, in this embodiment, assuming that there is a scheduled uplink scheduling unit on a frequency domain resource corresponding to an uplink signal 1, inter-terminal interference is generated on the frequency domain resource. In this case, for information about inter-terminal interference corresponding to an uplink scheduling unit that needs to be scheduled by the base station currently, $$IntUe = \sum_{i \in \Omega_{ULq\text{-}active\text{-}freq}(ufs)} |h_i^H * h|^2,$$

where $\Omega_{ULq\text{-}active\text{-}freq}(ufs)$ is a set of terminals that have been scheduled at a frequency domain resource position ufs of an uplink carrier 1. The base station may obtain a channel response $h_i=[h_{i1}, h_{i2}, \ldots, h_{iR}]^T$ of a scheduled terminal i at a frequency domain resource position of an uplink carrier, where h is a channel response of the terminal j on an uplink scheduling unit that is not scheduled. Therefore, based on the information IntUe about inter-terminal interference, the information about predicted interference to the uplink scheduling unit 1 may be Sir1=Sig1/(Int1+IntUe), or may be a sum of Int1 and IntUe.

It should be noted that this embodiment is described by using only an example in which N=2, namely, an example of interference impact, on the uplink signal, of passive intermodulation signals generated by a downlink carrier 1 and a downlink carrier 2. As described in the scenario 2, N may be any positive integer greater than or equal to 2. Therefore, when there are a plurality of tables, for example, the examples in the scenario 2, there may be interference information tables TabDlabcUl1 (ufs, uss, dfsa, dssa, dfsb, dssb, dfsc, dssc), TabDlabUl1 (ufs, uss, dfsa, dssa, dfsb, dssb), TabDlacUl1 (ufs, uss, dfsa, dssa, dfsc, dssc), and TabDlbcUl1 (ufs, uss, dfsb, dssb, dfsc, dssc) when N=3. Different from the scenario in which N=2, in this scenario, the sum of the information about interference may be calculated according to a formula (3):

Int=Tab*DlabcUl*1(*ufs,uss*)+Tab*DlabUl*1(*ufs,uss*)+
Tab*DlbcUl*1(*ufs,uss*)+Tab*DlacUl*1(*ufs,uss*)    (3)

When the information about predicted interference to each uplink scheduling unit is calculated, in addition to passive intermodulation signals generated by interaction between downlink scheduling units on the downlink carrier 1, the downlink carrier 2, and a downlink carrier 3, passive intermodulation signals generated by interaction between the downlink carrier 1 and the downlink carrier 2, between the downlink carrier 2 and the downlink carrier 3, and/or between the downlink carrier 1 and the downlink carrier 3 needs to be further considered.

Optionally, when N=3, the sum of the information about interference to each uplink scheduling unit may alternatively be Int=TabDlabcUl1 (ufs, uss). That is, interaction between two downlink carriers may not be considered, and only impact of passive intermodulation signals generated by three downlink carriers is calculated.

Step 303: The base station schedules $m_1$ uplink scheduling units based on the information about predicted interference.

In this embodiment of this application, after the base station obtains the information (namely, Sir1, Sir2, Sir3, and Sir4) about predicted interference of the $n_1$ downlink scheduling units to each uplink scheduling unit on the uplink carrier, an uplink scheduling unit set {uplink scheduling unit 1, uplink scheduling unit 2, uplink scheduling unit 3, uplink scheduling unit 4} is generated.

Then, the base station may arrange elements in the uplink scheduling unit set in ascending order of information about predicted interference corresponding to the elements (it should be noted that the information about predicted interference is arranged in ascending order, indicating that the uplink scheduling units in the uplink scheduling unit set are arranged in ascending order of interference impact of passive intermodulation signals generated by the $n_1$ downlink scheduling units), and select first $m_1$ uplink scheduling units, where $m_1$ is an integer greater than 1. It should be noted that $m_1$ needs to be determined based on a plurality of factors such as a processing capability of the base station and the terminal requirement. A specific determining manner may be selected based on an actual requirement. While details are not described in this application it is expressly understood that one skilled in the art could implement the disclosed embodiments using ascending order of inference impact of passive intermodulation signals. It is further understood that some other order, in other embodiments, might be used.

Then, the $m_1$ uplink scheduling units (for example, the uplink scheduling unit 1 and the uplink scheduling unit 2) are selected. The base station schedules the $m_1$ uplink scheduling units, and deletes the $m_1$ uplink scheduling units from the uplink scheduling unit set. That is, each uplink scheduling unit can be scheduled only once during resource scheduling, and can be scheduled again during next resource scheduling.

For example, the base station arranges the information about predicted interference in ascending order, and the information about predicted interference is used to indicate a magnitude of predicted interference impact of the $n_1$ downlink scheduling units on the uplink signal. Therefore, if the information about predicted interference is the sum of the information about interference, sums of the information about interference corresponding to the uplink scheduling units are arranged in ascending order. The base station may select, from a queue, the $1^{st}$ uplink scheduling unit (for example, the uplink scheduling unit 1) of the queue, namely, an uplink scheduling unit that is least affected by interference, to allocate the uplink scheduling unit 1 to the terminal 1, and delete the uplink scheduling unit 1 from the uplink scheduling unit set. If the base station further needs to allocate an uplink scheduling unit to a terminal 1 and/or another terminal based on a requirement of the terminal 1 or the another terminal, the base station re-allocates the $1^{st}$ uplink scheduling unit (for example, the uplink scheduling unit 3) in the uplink scheduling unit set to the terminal 1 or the another terminal, deletes the uplink scheduling unit 3 from the uplink scheduling unit set, and sequentially repeats the foregoing steps, to allocate an uplink scheduling unit to the terminal.

Optionally, in an embodiment, the information IntUe about inter-terminal interference is introduced when the information about predicted interference is obtained in step 302. In this case, when the terminal j and/or the terminal i schedule/schedules two or more uplink scheduling units, interference exists between the uplink scheduling units. Therefore, in this case, $m_1$ scheduling units corresponding to the terminal j are determined in the following manner. The base station arranges the information about predicted interference in ascending order, and selects the $1^{st}$ uplink scheduling unit of a queue, namely, an uplink scheduling unit that is least affected by interference, and allocates the uplink scheduling unit to the terminal j. If it is determined that the terminal j further needs to schedule an uplink scheduling unit, step 302 is repeated, that is, information about predicted interference to a scheduling unit other than the uplink scheduling unit that has been allocated to the terminal j is re-obtained, and then an uplink scheduling unit that is least affected by the interference is selected and allocated to the terminal j.

Optionally, in another embodiment, if there are a plurality of terminals, for example, the terminal j and the terminal i, in consideration of inter-terminal interference, after $m_1$ scheduling units corresponding to the terminal j are determined, for the terminal i, the base station needs to perform step 302 and step 303 again, that is, determines, for the terminal i based on a scheduling requirement of the terminal i, an uplink scheduling unit that can be allocated to the terminal i. An uplink scheduling unit allocated to the terminal i is different from an uplink scheduling unit allocated to the terminal j.

Scenario 4

Figure 9:
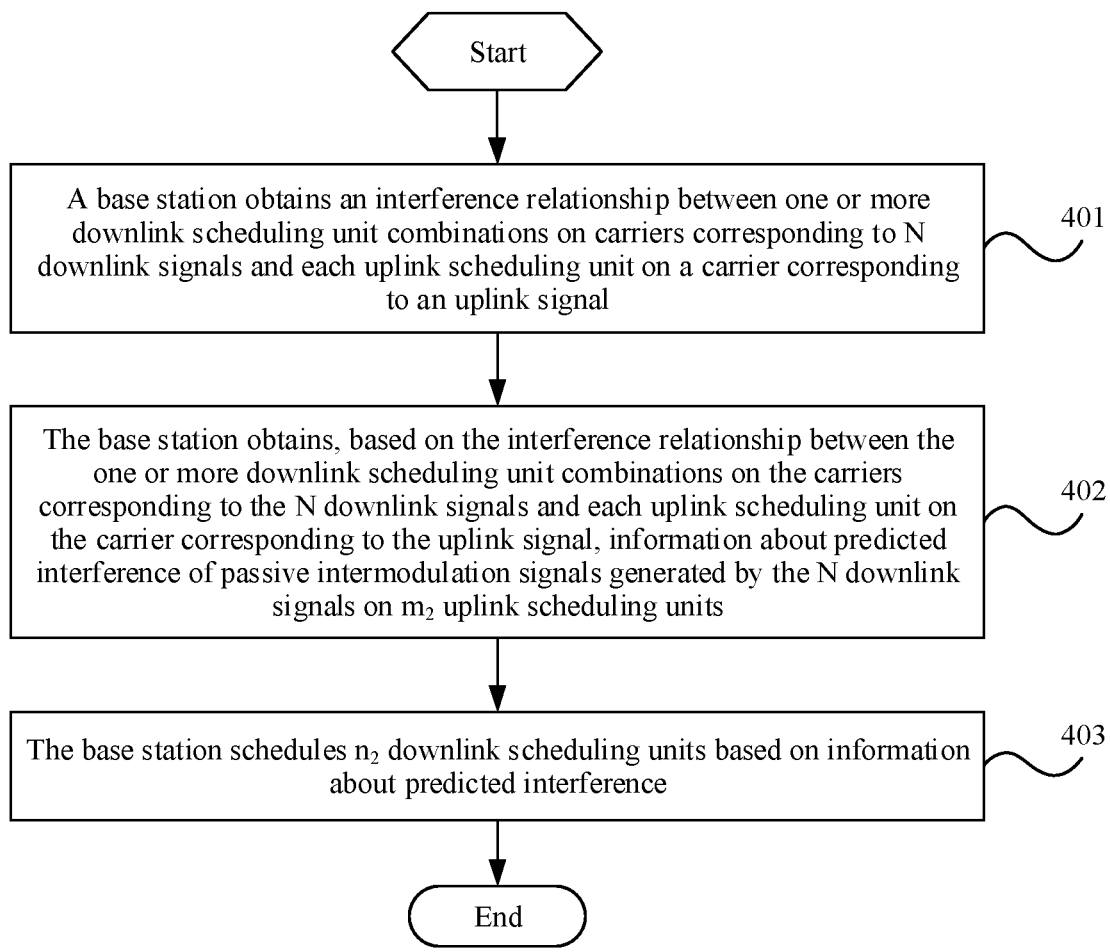
FIG. 9 is a fourth schematic flowchart of a scheduling method according to an embodiment of this application.

With reference to FIG. 1, FIG. 9 is a schematic flowchart of a scheduling method according to an embodiment of this application. FIG. 9 includes the following steps.

Step 401: A base station obtains an interference relationship between one or more downlink scheduling unit combinations on carriers corresponding to N downlink signals and each uplink scheduling unit on a carrier corresponding to an uplink signal.

For specific details, refer to step 201.

Step 402: The base station obtains, based on the interference relationship between the one or more downlink scheduling unit combinations on the carriers corresponding to the N downlink signals and each uplink scheduling unit on the carrier corresponding to the uplink signal, information about predicted interference of passive intermodulation signals generated by interaction between the N downlink signals to $m_2$ uplink scheduling units.

In this embodiment of this application, the base station may predict interference impact of the N downlink signals on the $m_2$ uplink scheduling units on the carrier corresponding to the uplink signal, and then determine, based on a predicted result, first $n_2$ downlink scheduling units, on the carriers corresponding to the N downlink signals, arranged in ascending order of interference impact on the $m_2$ uplink scheduling units, and $n_2$ is an integer greater than 1. It should be noted that the $m_2$ uplink scheduling units may be determined by the base station based on a terminal requirement. The terminal requirement may be a requirement of one or more terminals for uplink scheduling. This is not limited in this application.

To make a person skilled in the art better understand a process in which the base station obtains interference impact of the passive intermodulation signals generated by interaction between the N downlink signals to the $m_2$ uplink scheduling units, the following uses Table 2 in the scenario 2 as an example for detailed description.

(1) The base station determines, based on the terminal requirement, the $m_2$ to-be-received uplink scheduling units.

As shown in Table 2, the interference information table records information about interference of different downlink scheduling unit combinations to each uplink scheduling unit on an uplink carrier (Table 2 only indicates an interference relationship between the downlink scheduling unit combinations and each uplink scheduling unit on an uplink carrier 1, and it should be understood that, in another embodiment, the interference information table may be used to indicate an interference relationship between the downlink scheduling unit combinations and each uplink scheduling unit on all uplink carriers, to be specific, the uplink signal or the uplink carrier described in this embodiment of this application is initially set by the base station, that is, the base station may schedule all uplink carriers).

In this embodiment of this application, only an example in which $m_2=2$ and the base station determines, based on the terminal requirement, that a scheduled uplink scheduling unit set includes {uplink scheduling unit 1 (ufs1, uss1), uplink scheduling unit 2 (ufs1, uss2)} is used for detailed description.

(2) Determine a downlink scheduling unit set.

In this embodiment of this application, the base station may determine at least two downlink scheduling unit sets based on factors such as an actual processing capability and an actual load capability, and obtain information about predicted interference of each downlink scheduling unit set to the $m_2$ uplink scheduling units, to select, from the at least two downlink scheduling unit sets, a downlink scheduling unit set that has smallest interference impact on the $m_2$ uplink scheduling units for scheduling. It should be noted that elements in the at least two downlink scheduling unit sets may be randomly selected, or an operator may formulate a selection rule in advance. For example, the selection rule may be performing selection based on a resource load status. For example, if load corresponding to a frequency domain resource position dfs1 exceeds a threshold, dfs1 may not be selected. Alternatively, during selection, two or more downlink scheduling units may be randomly selected from downlink scheduling units whose load corresponding to frequency domain resource positions and/or space domain resource positions is less than a threshold.

Optionally, in an embodiment, a quantity of downlink scheduling units included in each downlink scheduling unit set may be determined by the base station based on the terminal requirement. For example, the base station needs only one downlink scheduling unit to send control information to a terminal 1, and needs two downlink scheduling units to send data information to a terminal 2. In this case, the base station needs to schedule at least three downlink scheduling units during current scheduling, that is, each downlink scheduling unit set includes three downlink scheduling units.

In this embodiment, an example in which a downlink scheduling unit set 1 includes {downlink scheduling unit 1, downlink scheduling unit 2, downlink scheduling unit 3} and a downlink scheduling unit set 2 includes {downlink scheduling unit 1, downlink scheduling unit 3, downlink scheduling unit 4} is used for detailed description.

(3) Obtain information about predicted interference of each downlink scheduling unit set to the $m_2$ uplink scheduling units.

With reference to the calculation method in the scenario 3, the base station may obtain information about predicted interference of each downlink scheduling unit set to each of the $m_2$ uplink scheduling units. Specific details of calculation are not described herein.

The downlink scheduling unit set 1 is used as an example. The base station may obtain information Sir1 about predicted interference of the downlink scheduling unit set 1 to the uplink scheduling unit 1 in the uplink scheduling unit set and information Sir2 about predicted interference of the downlink scheduling unit set 1 to the uplink scheduling unit 2.

Then, the base station obtains a sum SirA=Sir1+Sir2 of information about predicted interference of the downlink scheduling unit set 1 to the $m_2$ uplink scheduling units, namely, the uplink scheduling unit set. In addition, the base station obtains a sum SirB of information about predicted interference of the downlink scheduling unit set 2 to the uplink scheduling unit set according to the foregoing steps.

Step 403: The base station schedules $n_2$ downlink scheduling units based on the information about predicted interference.

In this embodiment of this application, the base station may compare SirA with SirB, and determine, based on a comparison result, a downlink scheduling unit set that has a smallest interference impact on the uplink scheduling unit set. For example, when Sir is a signal-to-noise ratio, a downlink scheduling unit set corresponding to a larger one of the sum SirA of the information about predicted interference and the sum SirB of the information about predicted interference is a set (for example, the downlink scheduling unit set 1) that has the smallest interference impact on the uplink scheduling unit set.

The base station may schedule $n_2$ downlink scheduling units included in the downlink scheduling unit set 1.

Scenario 5

Figure 10:
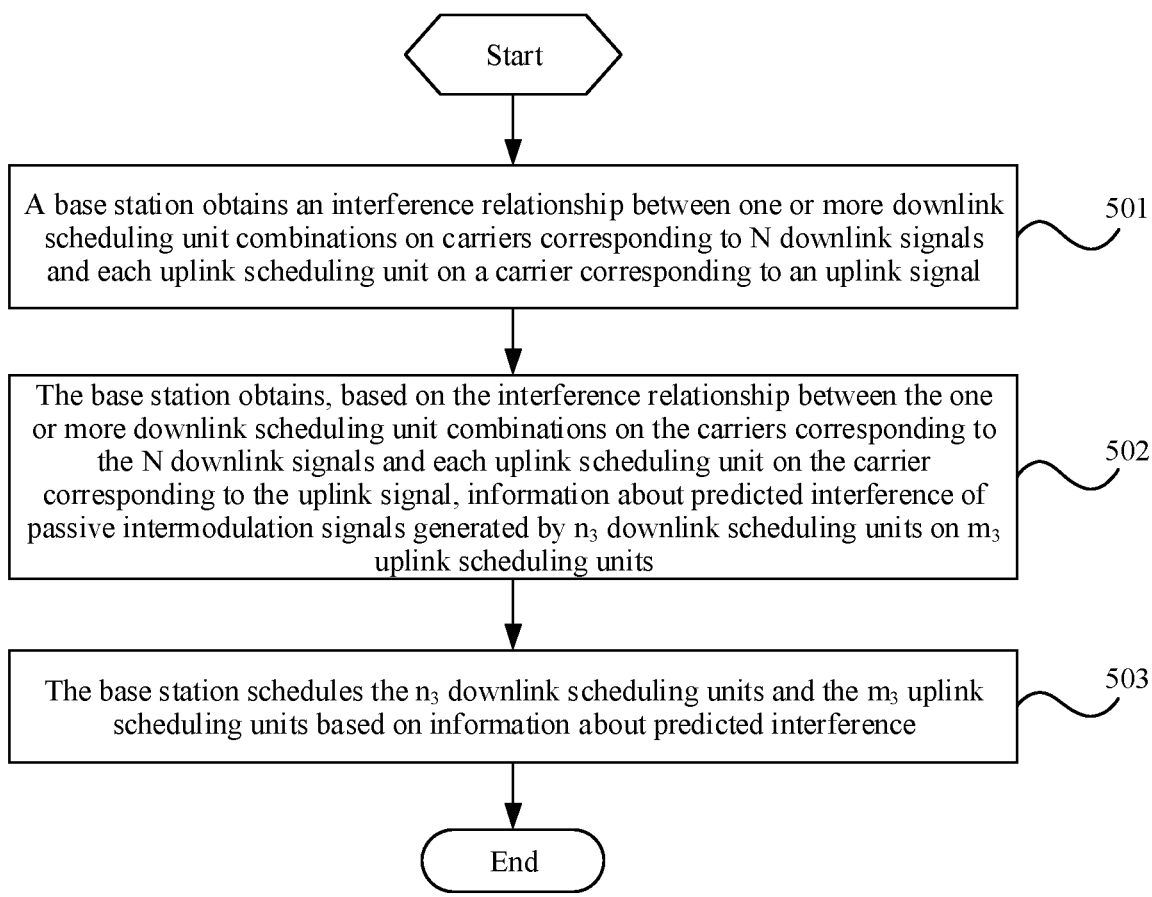
FIG. 10 is a fifth schematic flowchart of a scheduling method according to an embodiment of this application.

With reference to FIG. 1, FIG. 10 is a schematic flowchart of a scheduling method according to an embodiment of this application. FIG. 10 includes the following steps.

Step 501: A base station obtains an interference relationship between one or more downlink scheduling unit combinations on carriers corresponding to N downlink signals and each uplink scheduling unit on a carrier corresponding to an uplink signal.

For specific details, refer to step 201.

Step 502: The base station obtains, based on the interference relationship between the one or more downlink scheduling unit combinations on the carriers corresponding to the N downlink signals and each uplink scheduling unit on the carrier corresponding to the uplink signal, information about predicted interference of passive intermodulation signals generated by $n_3$ downlink scheduling units to $m_3$ uplink scheduling units.

In this embodiment of this application, the base station may predict interference impact, on the $m_3$ uplink scheduling units on the carrier corresponding to the uplink signal, of the $n_3$ downlink scheduling units on the carriers corresponding to the N downlink signals, and then determine, based on a predicted result, a corresponding resource combination (where the corresponding combination is a combination of the $n_3$ downlink scheduling units and the $m_3$ uplink scheduling units) that has an optimal predicted interference result, to schedule the determined resource combination, thereby jointly scheduling a downlink scheduling unit and an uplink scheduling unit.

Optionally, in an embodiment, a manner of determining the $n_3$ downlink scheduling units and the $m_3$ uplink scheduling units that are to be scheduled may be: creating at least two downlink scheduling unit sets (where at least two downlink scheduling units included in the downlink scheduling unit set may be randomly selected by the base station, or may be selected according to a preset rule (where the rule may be set by an operator based on an actual requirement), which is not limited in this application), and obtaining first information about predicted interference of each downlink scheduling unit set to each uplink scheduling unit on an uplink carrier. For a specific manner of obtaining the first information about predicted interference, refer to details in the scenario 3. Details are not described herein again. Then, the base station may arrange the obtained first information about predicted interference to each uplink scheduling unit in ascending order, and select first $m_3$ uplink scheduling units (where $m_3$ may be randomly selected by the base station, or may be selected according to a preset rule (where the rule may be set by an operator based on an actual requirement), which is not limited in this application), to form a target uplink scheduling unit set. Then, the base station further creates at least two downlink scheduling unit sets (where the at least two re-created scheduling sets are different from the at least two created downlink scheduling unit sets), and determines a downlink scheduling unit set that is in the at least two downlink scheduling unit sets and that has smallest interference impact on the uplink scheduling unit set as a target downlink scheduling unit set. For a specific obtaining manner, refer to details in the scenario 4. Details are not described herein again. In this case, in step 503, the base station may schedule a downlink scheduling unit in the target downlink scheduling unit set and an uplink scheduling unit in the target uplink scheduling unit set.

Optionally, in another embodiment, a manner of determining the $n_3$ downlink scheduling units and the $m_3$ uplink scheduling units that are to be scheduled may alternatively be: simultaneously creating a plurality of resource combinations of a downlink scheduling unit set and an uplink scheduling unit set. The following describes specific solutions in this embodiment in detail.

In this embodiment, the base station may determine a plurality of resource combinations, for example, a resource combination 1: a downlink scheduling unit set 1 {downlink scheduling unit 1, downlink scheduling unit 5} and an uplink scheduling unit set 1 {uplink scheduling unit 1, uplink scheduling unit 2}; a resource combination 2: a downlink scheduling unit set 2 {downlink scheduling unit 1, downlink scheduling unit 6} and an uplink scheduling unit set 2 {uplink scheduling unit 1, uplink scheduling unit 3}; and a resource combination 3: a downlink scheduling unit set 3 {downlink scheduling unit 1, downlink scheduling unit 7} and an uplink scheduling unit set 3 {uplink scheduling unit 1, uplink scheduling unit 4}.

Then, the base station may calculate interference impact of each resource combination. The resource combination 1 is used as an example for detailed description. The base station may obtain information Sir1 about predicted interference of a passive intermodulation signal generated by interaction between the downlink scheduling unit 1 and the downlink scheduling unit 5 to the uplink scheduling unit 1, and information Sir2 about predicted interference of a passive intermodulation signal generated by interaction between the downlink scheduling unit 1 and the downlink scheduling unit 5 to the uplink scheduling unit 2. Then, the base station obtains the downlink scheduling unit set 1, namely, interference impact of the downlink scheduling unit 1 and the downlink scheduling unit 5 on the uplink scheduling unit set 1, namely, a sum SirA (denoted as information about predicted interference of the resource combination 1) of the information Sir1 about predicted interference to the uplink scheduling unit 1 and the information Sir2 about predicted interference to the uplink scheduling unit 2. According to the foregoing steps, information SirB about predicted interference of the resource combination 2 and information SirC about predicted interference of the resource combination 3 are sequentially obtained.

The base station may compare the information (SirA, SirB, and SirC) about predicted interference corresponding to the resource combinations, and determine a target resource combination based on a comparison result. The target resource combination is a resource combination having optimal information about predicted interference (where if the information about predicted interference is a sum of information about interference, the target resource combination is a resource combination having a smallest sum of the information about interference; or if the information about predicted interference is a signal-to-noise ratio, the target resource combination is a resource combination having a largest signal-to-noise ratio).

Step 503: The base station schedules the $n_3$ downlink scheduling units and the $m_3$ uplink scheduling units based on the information about predicted interference.

In this embodiment of this application, after determining the target resource combination, the base station may schedule the $n_3$ downlink scheduling units and the $m_3$ uplink scheduling units included in the target resource combination.

Scenario 6

Figure 11:
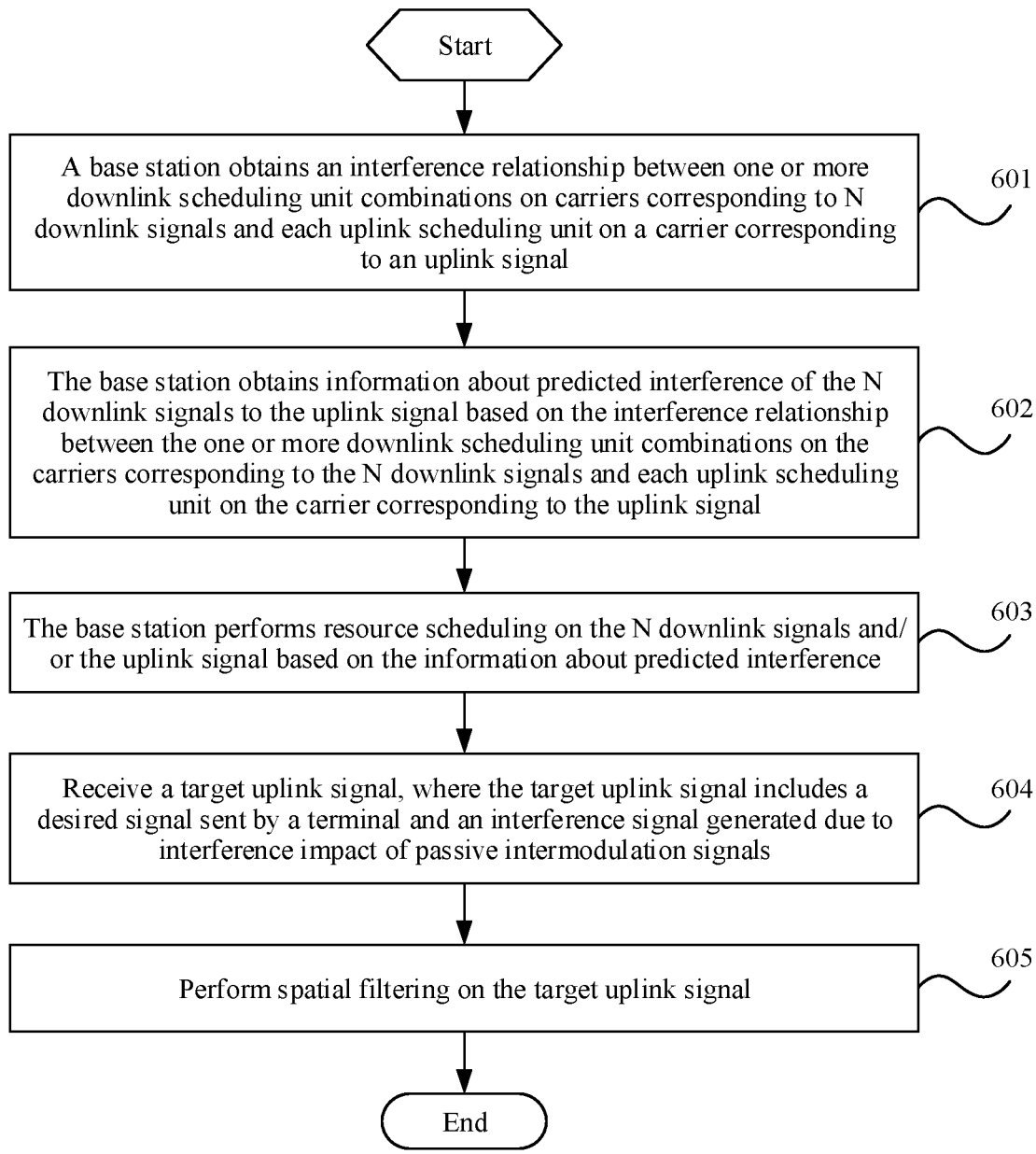
FIG. 11 is a sixth schematic flowchart of a scheduling method according to an embodiment of this application.

With reference to FIG. 1, FIG. 11 is a schematic flowchart of a scheduling method according to an embodiment of this application. FIG. 11 includes the following steps.

Step 601: A base station obtains an interference relationship between one or more downlink scheduling unit combinations on carriers corresponding to N downlink signals and each uplink scheduling unit on a carrier corresponding to an uplink signal.

For specific details, refer to step 201.

Step 602: The base station obtains information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

For specific details, refer to details in the scenario 2, the scenario 3, the scenario 4, and/or the scenario 5. Details are not described herein again.

Step 603: The base station performs resource scheduling on the N downlink signals and/or the uplink signal based on the information about predicted interference.

For specific details, refer to details in the scenario 2, the scenario 3, the scenario 4, and/or the scenario 5. Details are not described herein again.

Step 604: Receive a target uplink signal.

Optionally, in an embodiment, the target uplink signal includes but is not limited to an interference signal and a desired signal that is sent by a terminal (referring to one or more terminals) to the base station after receiving a scheduled downlink signal. The interference signal is a signal generated by interference impact of passive intermodulation signals generated by interaction between the N downlink signals.

Optionally, in another embodiment, the desired signal may alternatively be sent by the terminal to the base station based on a resource scheduling result of the uplink signal.

Optionally, in still another embodiment, step 604 may be further applied to a current technology, namely, an uplink signal on which resource scheduling is not performed by using the technical solutions in this embodiment of this application. In other words, step 604 and the remaining steps may not depend on step 603, but exist independently after the information about predicted interference is obtained in step 602.

Step 605: Perform spatial filtering on the target uplink signal.

Specifically, in this embodiment of this application, the base station may generate a spatial filtering matrix based on the obtained information about predicted interference, and perform spatial filtering on a signal at a frequency domain resource position of the target uplink signal based on the generated spatial filtering matrix.

The following describes in detail a step of generating the spatial filtering matrix based on the obtained information about predicted interference.

Specifically, in a process in which the base station performs spatial filtering on the target uplink signal, spatial filtering is performed on a signal at a frequency domain resource position corresponding to each ufs (namely, a frequency domain resource position of the minimum scheduling unit in the foregoing embodiment). The following uses an uplink scheduling unit 1 on an uplink carrier 1 as an example for detailed description.

First, the base station obtains information about actual interference to the target uplink signal based on a relationship between a frequency domain resource position (namely, ufs1) of the uplink scheduling unit 1 and the information about predicted interference. Specifically, in this embodiment of this application, the base station may obtain, by retrieving an interference information table corresponding to the uplink carrier 1, all corresponding uplink scheduling units at the frequency domain resource position ufs1 corresponding to the uplink scheduling unit 1. All the corresponding uplink scheduling units include the uplink scheduling unit 1 and an uplink scheduling unit 2.

Then, the base station obtains information about actual interference to the uplink scheduling unit 1 and the uplink scheduling unit 2. An obtaining method may be: The information about actual interference to the uplink scheduling unit 1 is a sum $\rho_1$ of all information about interference corresponding to the uplink scheduling units 1 in the interference information table, and the information about actual interference to the uplink scheduling unit 2 is a sum $\rho_2$ of all information about interference corresponding to the uplink scheduling units 2 in the interference information table.

Then, the base station obtains weight information $g_1$, $g_2$, ..., and $g_L$ of uplink scheduling units corresponding to the frequency domain resource position (ufs1), where $g_1$, $g_2$, ..., and $g_L$ are used to indicate weight information of uplink scheduling units corresponding to L space domain resources (where L is 2 in this embodiment) at the frequency domain resource position ufs1. That is, the base station obtains weight information of all uplink scheduling units (the uplink scheduling unit 1 and the uplink scheduling unit 2) at the frequency domain resource position ufs1. It should be noted that each uplink scheduling unit is received by R antennas of the base station. Therefore, weight information of each uplink scheduling unit may be represented as $g=[g_1, g_2, \ldots, g_R]^T$. That is, the weight information of the uplink scheduling unit is obtained based on a weight (or may be understood as direction information) of each of the R antennas. An example in which the weight information corresponding to the uplink scheduling unit 1 is $g_1$, and the weight information corresponding to the uplink scheduling unit 2 is $g_2$ is used for detailed description.

In this embodiment, the base station may generate a spatial interference matrix U based on the obtained information about actual interference and the obtained weight information. Specifically, singular value decomposition (Singular Value Decomposition, SVD) transformation is performed on $[\sqrt{\rho_1}g_1, \ldots, \sqrt{\rho_L}g_L]$ (where $\rho_L$ is information about actual interference to an uplink scheduling unit L corresponding to the $L^{th}$ space domain resource at ufs1, and $g_1$ is weight information of an uplink scheduling unit 1 corresponding to the $1^{th}$ space domain resource at ufs1), to obtain $[\sqrt{\rho_1}g_1, \sqrt{\rho_2}g_2, \ldots, \sqrt{\rho_L}g_L]=U\Sigma V^H$. U is an R×R unitary matrix, $\Sigma$ is an R×L non-negative real diagonal matrix, diagonal elements of the R×L non-negative real diagonal matrix are eigenvalues arranged in descending order, V is an L×L unitary matrix, and $V^H$ is a conjugate transpose of V. The matrix U may be divided into $U=[U_1, U_2]$. $U_1$ is an R×$L_1$ matrix, that is, $U_1$ is a matrix formed by left eigenvectors corresponding to $L_1$ maximum eigenvalues. $U_2$ is an R×(R–$L_1$) matrix, that is, $U_2$ is a matrix formed by left eigenvectors corresponding to R–$L_1$ minimum eigenvalues. $L_1$ is an algorithm parameter. In this embodiment of this application, $U_1$ is used to indicate an interference space that is most affected by interference from the passive intermodulation signals generated by interaction between the N downlink signals, and $U_2$ is used to indicate an interference space that is least affected by the interference from the passive intermodulation signals generated by interaction between the N downlink signals.

In this embodiment of this application, the base station may generate the spatial filtering matrix based on $U_1$ or $U_2$. Optionally, in an embodiment, the spatial filtering matrix generated based on $U_1$ may be $F=I_R-U_1U_1^H$, where $I_R$ is an R×R identity matrix. Optionally, in another embodiment, the spatial filtering matrix generated based on $U_2$ may be $F=U_2U_2^H$. A method for generating the spatial filtering matrix is not limited to the foregoing manner. A person skilled in the art may further calculate the spatial filtering matrix according to another formula. This is not limited in this application.

In this embodiment of this application, the base station may perform spatial filtering on the signal at the frequency domain resource position based on the generated spatial filtering matrix. Specifically, the base station may multiply the signal at the frequency domain resource position by the spatial filtering matrix corresponding to the frequency domain resource position, to implement spatial filtering on the target uplink signal. For example, if the frequency domain resource position is ufs1, and the signal corresponding to the frequency domain resource position is $y=[y_1, y_2, \ldots, y_R]^T$, that is, the signal at ufs1 may be received by the R antennas of the base station, spatial filtering is performed on the signal at ufs1, and a signal obtained through filtering is $y^{new}=Fy$.

According to the foregoing steps, the base station may sequentially generate a spatial filtering matrix corresponding to a signal at each frequency domain resource position, and perform spatial filtering on the signal at the frequency domain resource position based on the corresponding spatial filtering matrix, to implement a spatial filtering process on the target uplink signal.

In conclusion, in the technical solutions in the embodiments of this application, spatial filtering is performed on the target uplink signal, so that an effect of suppressing interference from the passive intermodulation signals can be further improved.

The foregoing mainly describes the solutions provided in the embodiments of this application from a perspective of interaction between network elements. It can be understood that, to implement the foregoing functions, a scheduling apparatus includes a corresponding hardware structure and/or software module for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the scheduling apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. In actual implementation, another division manner may be used.

Figure 12:
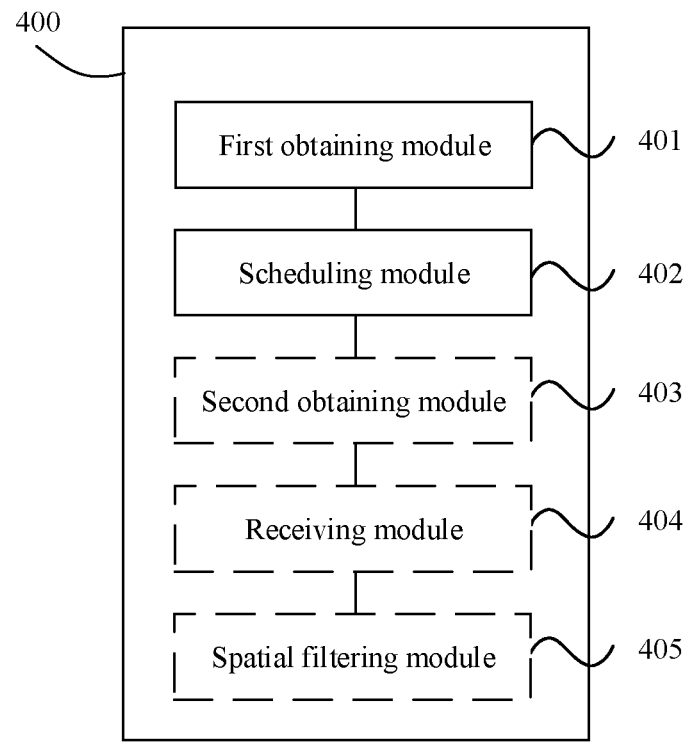
FIG. 12 is a schematic structural diagram of a scheduling apparatus according to an embodiment of this application.

The following describes a scheduling apparatus provided in an embodiment of this application. FIG. 12 is a schematic structural diagram of a scheduling apparatus according to an embodiment of this application. In FIG. 12, a scheduling apparatus 400 may include a first obtaining module 401 and a scheduling module 402. The first obtaining module 401 may be configured to perform a step of "obtaining information about predicted interference of N downlink signals of a base station to an uplink signal". For example, the first obtaining module 401 may be configured to support the scheduling apparatus in performing step 101, step 202, step 302, step 402, step 502, and step 602 in the foregoing embodiments. The scheduling module 402 may be configured to perform a step of "performing resource scheduling on the N downlink signals and/or the uplink signal based on the information about predicted interference". For example, the scheduling module 402 may be configured to support the scheduling apparatus in performing step 102, step 203, step 303, step 403, step 503, and step 603 in the foregoing embodiments.

Optionally, in an embodiment, the scheduling apparatus 400 may further include a second obtaining module 403, a receiving module 404, and a spatial filtering module 405. The second obtaining module 403 is configured to perform a step of "obtaining an interference relationship between one or more downlink scheduling unit combinations on carriers corresponding to N downlink signals and each uplink scheduling unit on a carrier corresponding to an uplink signal". For example, the second obtaining module 403 may be configured to support the scheduling apparatus in performing step 201, step 301, step 401, step 501, and step 601 in the foregoing embodiments. The receiving module 404 may be configured to perform a step of "receiving a target uplink signal". For example, the receiving module 404 may be configured to support the scheduling apparatus in performing step 604 in the foregoing embodiments. The spatial filtering module 405 may be configured to perform a step of "performing spatial filtering on the target uplink signal". For example, the module may be configured to support the scheduling apparatus in performing step 605 in the foregoing embodiments.

Figure 13:
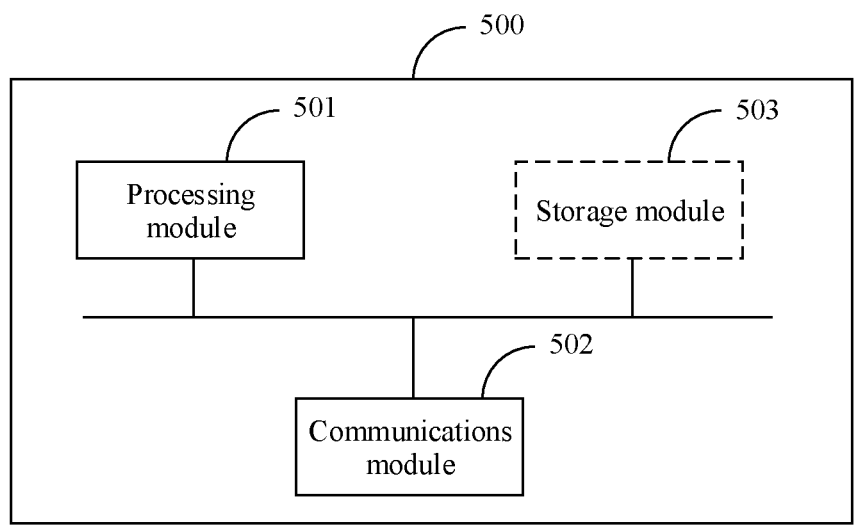
FIG. 13 is a schematic structural diagram of an apparatus according to an embodiment of this application.

The following describes an apparatus 500 provided in an embodiment of this application. As shown in FIG. 13, the apparatus 500 includes a processing module 501 and a communications module 502. Optionally, the apparatus further includes a storage module 503. The processing module 501, the communications module 502, and the storage module 503 are connected by using a communications bus.

The communications module 502 may be an apparatus that has a transceiver function, and is configured to communicate with another network device or a communications network.

The storage module 503 may include one or more memories. The memory may be a component configured to store a program or data in one or more devices or circuits.

The storage module 503 may exist independently, and is connected to the processing module 501 by using the communications bus. Alternatively, the storage module may be integrated into the processing module 501.

The apparatus 500 may be used in a network device, a circuit, a hardware component, or a chip.

The apparatus 500 may be the base station in the embodiments of this application. A schematic diagram of the base station may be shown in FIG. 2. Optionally, the communications module 502 of the apparatus 500 may include an antenna and a transceiver of the base station, for example, the antenna 105 and the transceiver 103 in FIG. 2. The communications module 502 may further include a network interface of the base station, for example, the network interface 104 in FIG. 2.

The apparatus 500 may be a chip in the base station in the embodiments of this application. The communications module 502 may be an input/output interface, a pin, a circuit, or the like. Optionally, the storage module may store a computer-executable instruction of a method on a base station side, to enable the processing module 501 to perform the method on the base station side in the foregoing embodiments. The storage module 503 may be a register, a buffer, a RAM, or the like, and the storage module 503 may be integrated into the processing module 501. The storage module 503 may be a ROM or another type of static storage device capable of storing static information and instructions, and the storage module 503 may be independent of the processing module 501. Optionally, with development of wireless communications technologies, the transceiver may be integrated into the apparatus 500. For example, the transceiver 103 and the network interface 104 are integrated into the communications module 502.

When the apparatus 500 is the base station or the chip in the base station in the embodiments of this application, the method performed by the base station in the foregoing embodiments can be implemented.

All related content of the steps in the foregoing method embodiments may be cited in function descriptions of a corresponding functional module. Details are not described herein again.

Based on a same technical concept, an embodiment of this application further provides a computer-readable storage medium. The computer-readable storage medium stores a computer program, the computer program includes at least one segment of code, and the at least one segment of code may be executed by a scheduling apparatus, to control the scheduling apparatus to implement the foregoing method embodiments.

Based on a same technical concept, an embodiment of this application further provides a computer program. When the computer program is executed by a scheduling apparatus, the computer program is configured to implement the foregoing method embodiments.

The program may be completely or partially stored in a storage medium that is encapsulated with a processor, or may be completely or partially stored in a memory that is not encapsulated with a processor.

Based on a same technical concept, an embodiment of this application further provides a processor. The processor is configured to implement the foregoing method embodiments. The processor may be a chip.

The methods or algorithm steps described in combination with the content disclosed in the embodiments of this application may be implemented by hardware, or may be implemented by a processor executing software instructions. The software instructions may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the field. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device. Certainly, the processor and the storage medium may exist in the network device as discrete components.

A person of skill in the art should be aware that, in one or more of the foregoing examples, the functions described in the embodiments of this application may be implemented by using hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible by a general-purpose or dedicated computer.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A scheduling method, applied to a base station, wherein the method comprises:
obtaining information about a predicted interference of N downlink signals of the base station to an uplink signal, wherein N is an integer greater than 1 and the information about predicted interference is used to indicate predicted interference impact of passive intermodulation signals generated by interaction between the N downlink signals on the uplink signal;
determining, based on the information about predicted interference, $n_2$ downlink scheduling units on the carriers corresponding to the N downlink signals, wherein the $n_2$ downlink scheduling units are first $n_2$ downlink scheduling units on the carriers corresponding to the N downlink signals, arranged in ascending order of interference impact on the $m_2$ uplink scheduling units, and $n_2$ is an integer greater than 1;
performing resource scheduling based on the information about predicted interference, wherein the resource scheduling comprises frequency and space domain resource scheduling and scheduling the $n_2$ downlink scheduling units; and
performing spatial filtering on a target uplink signal.

2. The method according to claim 1, wherein the information about predicted interference is predicted interference impact of $n_1$ downlink scheduling units on the uplink signal, wherein the $n_1$ downlink scheduling units are located on carriers corresponding to the N downlink signals, and $n_1$ is an integer greater than 1.

3. The method according to claim 2, wherein the performing resource scheduling comprises:
determining, based on the information about predicted interference, $m_1$ uplink scheduling units on a carrier corresponding to the uplink signal, wherein the $m_1$ uplink scheduling units are first $m_1$ scheduling units, on the carrier corresponding to the uplink signal, arranged in ascending order of interference impact of passive intermodulation signals generated by the $n_1$ downlink scheduling units, and $m_1$ is an integer greater than or equal to 1; and
scheduling the $m_1$ uplink scheduling units.

4. The method according to claim 1, wherein the information about predicted interference is predicted interference impact, on $m_2$ uplink scheduling units, of the passive intermodulation signals generated by interaction between the N downlink signals, wherein the $m_2$ uplink scheduling units are located on the carrier corresponding to the uplink signal, and $m_2$ is an integer greater than or equal to 1.

5. The method according to claim 1, further comprising: obtaining an interference relationship between one or more downlink scheduling unit combinations on the carriers corresponding to the N downlink signals and each uplink scheduling unit on the carrier corresponding to the uplink signal, wherein each downlink scheduling unit combination comprises two or more downlink scheduling units on carriers corresponding to two or more downlink signals in the N downlink signals; and
the obtaining information about predicted interference of N downlink signals of the base station to an uplink signal further comprises obtaining the information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

6. The method according to claim 1, wherein the method further comprises:
receiving the target uplink signal, wherein the target uplink signal comprises a desired uplink signal sent by a terminal and an interference signal generated due to the interference impact of the passive intermodulation signals; and
performing spatial filtering on the target uplink signal.

7. A base station, comprising:
a memory storing instructions; and
at least one processor in communication with the memory, the at least one processor configured, upon execution of the instructions, to perform the following steps:
obtaining information about predicted interference of N downlink signals of the base station to an uplink signal, wherein N is an integer greater than 1, and the information about predicted interference is used to indicate predicted interference impact, on the uplink signal, of passive intermodulation signals generated by interaction between the N downlink signals;
determining, based on the information about predicted interference, $n_2$ downlink scheduling units on the carriers corresponding to the N downlink signals, wherein the $n_2$ downlink scheduling units are first $n_2$ downlink scheduling units on the carriers corresponding to the N downlink signals, arranged in ascending order of interference impact on the $m_2$ uplink scheduling units, and $n_2$ is an integer greater than 1;
performing resource scheduling based on the information about predicted interference, wherein the resource scheduling comprises frequency domain resource scheduling and space domain resource scheduling and scheduling the $n_2$ downlink scheduling units; and
performing spatial filtering on a target uplink signal.

8. The base station according to claim 7, wherein the information about predicted interference is predicted interference impact of $n_1$ downlink scheduling units on the uplink signal, wherein the $n_1$ downlink scheduling units are located on carriers corresponding to the N downlink signals, and $n_1$ is an integer greater than 1.

9. The base station according to claim 8, wherein the performing resource scheduling based on the information about predicted interference specifically comprises:
determining, based on the information about predicted interference, $m_1$ uplink scheduling units on a carrier corresponding to the uplink signal, wherein the $m_1$ uplink scheduling units are first $m_1$ scheduling units, on the carrier corresponding to the uplink signal, arranged in ascending order of interference impact of passive intermodulation signals generated by the $n_1$ downlink scheduling units, and $m_1$ is an integer greater than or equal to 1; and
scheduling the $m_1$ uplink scheduling units.

10. The base station according to claim 7, wherein the information about predicted interference is predicted interference impact, on $m_2$ uplink scheduling units, of the passive intermodulation signals generated by interaction between the N downlink signals, wherein the $m_2$ uplink scheduling units are located on the carrier corresponding to the uplink signal, and $m_2$ is an integer greater than or equal to 1.

11. The base station according to claim 7, wherein, when executed, the instructions cause the base station to perform operations comprising:
obtaining an interference relationship between one or more downlink scheduling unit combinations on the carriers corresponding to the N downlink signals and each uplink scheduling unit on the carrier corresponding to the uplink signal, wherein each downlink scheduling unit combination comprises two or more downlink scheduling units on carriers corresponding to two or more downlink signals in the N downlink signals; and the obtaining information about predicted interference of N downlink signals of the base station to an uplink signal further comprises obtaining the information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

12. The base station according to claim 7, wherein, when executed, the instructions cause the base station to perform operations comprising:

receiving the target uplink signal, wherein the target uplink signal comprises a desired uplink signal sent by a terminal and an interference signal generated due to the interference impact of the passive intermodulation signals; and performing spatial filtering on the target uplink signal.

13. A non-transitory memory storage medium comprising computer-executable instructions that, when executed, facilitate a base station carrying out operations comprising:

obtaining information about predicted interference of N downlink signals of the base station to an uplink signal, wherein N is an integer greater than 1, and the information about predicted interference is used to indicate predicted interference impact, on the uplink signal, of passive intermodulation signals generated by interaction between the N downlink signals;

determining, based on the information about predicted interference, $n_2$ downlink scheduling units on the carriers corresponding to the N downlink signals, wherein the $n_2$ downlink scheduling units are first $n_2$ downlink scheduling units on the carriers corresponding to the N downlink signals, arranged in ascending order of interference impact on the $m_2$ uplink scheduling units, and $n_2$ is an integer greater than 1;

performing resource scheduling on the N downlink signals and/or the uplink signal based on the information about predicted interference, wherein the resource scheduling comprises frequency domain resource scheduling and space domain resource scheduling and scheduling the $n_2$ downlink scheduling units; and performing spatial filtering on a target uplink signal.

14. The non-transitory memory storage medium according to claim 13, wherein the information about predicted interference is predicted interference impact of $n_1$ downlink scheduling units on the uplink signal, wherein the $n_1$ downlink scheduling units are located on carriers corresponding to the N downlink signals, and $n_1$ is an integer greater than 1.

15. The non-transitory memory storage medium according to claim 14, wherein the performing resource scheduling on the N downlink signals and/or the uplink signal based on the information about predicted interference specifically comprises:

determining, based on the information about predicted interference, $m_1$ uplink scheduling units on a carrier corresponding to the uplink signal, wherein the $m_1$ uplink scheduling units are first $m_1$ scheduling units, on the carrier corresponding to the uplink signal, arranged in ascending order of interference impact of passive intermodulation signals generated by the $n_1$ downlink scheduling units, and $m_1$ is an integer greater than or equal to 1; and scheduling the $m_1$ uplink scheduling units.

16. The non-transitory memory storage medium according to claim 13, wherein the information about predicted interference is predicted interference impact, on $m_2$ uplink scheduling units, of the passive intermodulation signals generated by interaction between the N downlink signals, wherein the $m_2$ uplink scheduling units are located on the carrier corresponding to the uplink signal, and $m_2$ is an integer greater than or equal to 1.

17. The non-transitory memory storage medium according to claim 13, wherein when the instructions executed, carrying out operations comprising:

obtaining an interference relationship between one or more downlink scheduling unit combinations on the carriers corresponding to the N downlink signals and each uplink scheduling unit on the carrier corresponding to the uplink signal, wherein each downlink scheduling unit combination comprises two or more downlink scheduling units on carriers corresponding to two or more downlink signals in the N downlink signals; and the obtaining information about predicted interference of N downlink signals of the base station to an uplink signal specifically comprises:

obtaining the information about predicted interference of the N downlink signals to the uplink signal based on the interference relationship between the one or more downlink scheduling unit combinations on the carriers corresponding to the N downlink signals and each uplink scheduling unit on the carrier corresponding to the uplink signal.

* * * * *